US009951287B2

(12) United States Patent
Johnson et al.

(10) Patent No.: US 9,951,287 B2
(45) **Date of Patent: *Apr. 24, 2018**

(54) LOW SULFUR COAL ADDITIVE FOR IMPROVED FURNACE OPERATION

(71) Applicant: ADA-ES, Inc., Highlands Ranch, CO (US)

(72) Inventors: Stephen Allen Johnson, Windham, NH (US); John Wurster, Evergreen, CO (US); John Philip Comer, Manchester, NH (US)

(73) Assignee: ADA-ES, INC., Littleton, CO (US)

( * ) Notice: Subject to any disclaimer, the term of this patent is extended or adjusted under 35 U.S.C. 154(b) by 216 days.

This patent is subject to a terminal disclaimer.

(21) Appl. No.: 14/533,765

(22) Filed: Nov. 5, 2014

(65) Prior Publication Data

US 2015/0053123 A1 Feb. 26, 2015

Related U.S. Application Data

(60) Continuation of application No. 10/622,677, filed on Jul. 18, 2003, now Pat. No. 8,919,266, which is a (Continued)

(51) Int. Cl.
*F23J 3/00* (2006.01)
*C10L 10/04* (2006.01)
(Continued)

(52) U.S. Cl.
CPC ................. *C10L 10/04* (2013.01); *C10L 9/10* (2013.01); *F23J 7/00* (2013.01); *F23J 9/00* (2013.01); *F23G 2202/20* (2013.01); *F23G 2203/30* (2013.01); *F23K 2201/505* (2013.01); *Y02E 20/12* (2013.01)

(58) Field of Classification Search
CPC .................. F23J 3/00; F23B 7/00; F23K 1/00
USPC ....... 110/218, 219, 234, 236, 263, 266, 341, 110/343, 346, 347, 342, 344, 348
See application file for complete search history.

(56) References Cited

U.S. PATENT DOCUMENTS 1,955,574 A 4/1934 Benner et al.
2,844,112 A 7/1958 Muller et al.
(Continued)

FOREIGN PATENT DOCUMENTS

CN 1052838 7/1991
EP 0060354 9/1982
(Continued)

OTHER PUBLICATIONS

"Cyclones" sTEAM /Its Generation and Use , Chapter 14, (Babcock and Wilcox) 7 pages 1992.*

(Continued)

*Primary Examiner* — Kenneth Rinehart
(74) *Attorney, Agent, or Firm* — Sheridan Ross P.C.

(57) ABSTRACT

The present invention is directed to additives for coal-fired furnaces, particularly furnaces using a layer of slag to capture coal particles for combustion. The additive(s) include iron, mineralizer(s), handling aid(s), flow aid(s), and/or abrasive material(s). The iron and mineralizers can lower the melting temperature of ash in low-iron, high alkali coals, leading to improved furnace performance.

89 Claims, 8 Drawing Sheets

Viscosity vs. Temperature

Related U.S. Application Data continuation of application No. 09/893,079, filed on Jun. 26, 2001, now Pat. No. 6,729,248, and a division of application No. 10/209,083, filed on Jul. 30, 2002, now Pat. No. 7,332,002, and a division of application No. 10/209,089, filed on Jul. 30, 2002, now Pat. No. 6,773,471.

(60) Provisional application No. 60/213,915, filed on Jun. 26, 2000.

(51) Int. Cl.
*C10L 9/10* (2006.01)
*F23J 7/00* (2006.01)
*F23J 9/00* (2006.01)

(56) References Cited

U.S. PATENT DOCUMENTS 3,004,836 A 10/1961 Thompson et al.
3,332,755 A 7/1967 Kukin
3,823,676 A 7/1974 Cook et al.
3,896,746 A 7/1975 Pirsh
3,947,354 A 3/1976 Swanson et al.
3,970,434 A 7/1976 Gasior et al.
4,051,316 A 9/1977 Wing et al.
4,083,783 A 4/1978 Wing et al.
4,089,507 A 5/1978 Arai et al.
4,173,454 A 11/1979 Heins
4,230,460 A 10/1980 Maust, Jr.
4,238,329 A 12/1980 Zievers
4,364,818 A 12/1982 Schmid et al.
4,372,227 A 2/1983 Mahoney et al.
4,377,118 A 3/1983 Sadowski
4,385,891 A 5/1983 Ligotti
4,438,709 A 3/1984 Borio et al.
4,498,402 A 2/1985 Kober et al.
4,514,256 A 4/1985 Kober et al.
4,564,374 A 1/1986 Hofmann
4,572,085 A * 2/1986 Hepworth ................. C10L 9/10 110/342
4,577,566 A 3/1986 Merrell
4,586,443 A 5/1986 Burge et al.
4,598,652 A 7/1986 Hepworth
4,668,429 A 5/1987 Najjar
4,671,804 A 6/1987 Najjar
4,706,579 A 11/1987 Merrell
4,741,278 A * 5/1988 Franke ...................... C10L 9/10 110/342
4,753,632 A 6/1988 Hofmann et al.
4,765,258 A 8/1988 Zauderer
4,784,670 A 11/1988 Najjar
4,796,548 A 1/1989 Merrell et al.
4,831,942 A 5/1989 Morimoto et al.
4,843,980 A * 7/1989 Markham .............. B01D 53/60 110/342
4,886,521 A 12/1989 Khan
4,919,826 A 4/1990 Alzner
5,001,994 A 3/1991 Morimoto et al.
5,017,135 A 5/1991 Meyer
5,022,329 A 6/1991 Rackley et al.
5,046,265 A 9/1991 Kalb
5,052,312 A 10/1991 Rackley et al.
5,114,578 A 5/1992 Sundström
5,192,338 A 3/1993 Waugh et al.
5,196,648 A 3/1993 Jones
5,207,164 A 5/1993 Breen et al.
5,258,054 A * 11/1993 Ebenfelt ............. C21B 13/0026 75/443
5,282,430 A 2/1994 Nehls, Jr.
5,286,273 A * 2/1994 Nabi ....................... C21B 13/14 75/10.22
5,307,743 A 5/1994 Jones
5,324,336 A 6/1994 Child
5,320,051 A 7/1994 Nehls, Jr.
5,333,558 A 8/1994 Less, Jr.
5,357,002 A 10/1994 Lezzi et al.
5,364,421 A 11/1994 Westby et al.
5,402,990 A * 4/1995 Nabi ....................... C21B 13/14 266/144
5,577,910 A 11/1996 Holland
5,613,851 A 3/1997 Trawöger et al.
5,658,487 A 8/1997 Carey et al.
5,679,259 A 10/1997 Bolser
5,741,397 A 4/1998 Kraver
5,795,159 A 8/1998 Ralls et al.
5,797,742 A 8/1998 Fraker
5,819,672 A 10/1998 Radway et al.
5,855,649 A 1/1999 Durham et al.
5,885,076 A 3/1999 Ralls et al.
5,888,256 A 3/1999 Morrison
5,893,943 A * 4/1999 Durham ................. B01D 51/00 261/116
5,894,806 A 4/1999 Smyrniotis et al.
5,899,678 A 5/1999 Thomson et al.
5,972,066 A 10/1999 Lehtinen
6,022,216 A 2/2000 Cattani
6,083,306 A 7/2000 Cattani
6,139,751 A 10/2000 Bogaert et al.
6,165,366 A 12/2000 Sarangapani
6,206,685 B1 3/2001 Zamansky et al.
6,221,001 B1 4/2001 Comer et al.
6,258,456 B1 7/2001 Meyer
6,267,802 B1 7/2001 Baldrey et al.
6,471,506 B1 10/2002 Zamansky et al.
6,484,651 B1 11/2002 Shepard et al.
6,613,110 B2 9/2003 Sanyal
6,729,248 B2 5/2004 Johnson et al.
6,773,471 B2 8/2004 Johnson et al.
6,808,692 B2 10/2004 Oehr
6,878,358 B2 4/2005 Vosteen et al.
7,332,002 B2 2/2008 Johnson et al.
8,439,989 B2 5/2013 Baldrey et al.
8,919,266 B2 12/2014 Johnson et al.

FOREIGN PATENT DOCUMENTS

EP 0433674 6/1991
FR 1394847 4/1965
JP 11-94234 4/1999
WO WO 86/04602 8/1986
WO WO 91/09977 7/1991

OTHER PUBLICATIONS

"Chapter 20:Fuel ash effects on Boiler Design and Operation,"Steam/Its Generation and Use, (Babcock and Wilcox) 27 pages 1992.*
"ADA-ES Tests New Boiler Product," Coal Daily, Apr. 18, 2000, 1 page.
"Burning PRB Coals ADA Environmental Offers Flyash Solutions," Western Coal Advisory, Summer/Autumn 1999, 1 page.
"Chapter 10; Cyclone Furnaces," Steam/Its Generation and Use, Babcock & Wilcox Company, 1972, 38th Edition, pp. 10-1 to 10-8.
"Chapter 15: Fuel-ash Effects on Boiler Design and Operation," Steam/Its Generation and Use, Babcock and Wilcox Company, 1972, pp. 15-1 to 15-26.
"Chapter 21: Fuel Ash Effects on Boiler Design and Operation," Steam/Its Generation and Use, Babcock & Wilcox Company, 2005, 41st Edition, pp. 21-1 to 21-27.
"Iron- and Steelmaking," date unknown, pp. 646-660.
"Glass and nonmetallic mixtures" retrieved from www.eng.ku.ac.th/~mat/MatDB/MATDB/source/Struc/glass/into.htm, 3 pages.
Aldrich Chemical Catalog, Aldrich Chemical Co., Inc., 1996, pp. 863-866.
Declaration of Richard Schlager; Sep. 18, 2002.
Hatt, "Coal Properties, Sampling & Ash Characteristics," PRB Coal Use Seminar, sponsored by WCC, Aug. 3-4, 1999, St. Louis, MO, 7 pages.

(56) References Cited

OTHER PUBLICATIONS

Niessen, Combustion and Incineration Processes, 2002, Marcel Dekker, 3rd Edition, p. 25.
Revised Declaration of Richard Schlager, Aug. 19, 2003.
Sage et al., "Relationship of Coal-Ash Viscosity to Chemical Composition," Journal of Engineering for Power, Apr. 1960, pp. 145-155.
Official Action for U.S. Appl. No. 10/622,677, dated Jan. 29, 2004.
Official Action for U.S. Appl. No. 10/622,677, dated Oct. 6, 2004.
Official Action for U.S. Appl. No. 10/622,677, dated Sep. 9, 2005.
Official Action for U.S. Appl. No. 10/622,677, dated May 1, 2006.
Official Action for U.S. Appl. No. 10/622,677, dated Dec. 6, 2006.
Official Action for U.S. Appl. No. 10/622,677, dated Dec. 7, 2007.
Official Action for U.S. Appl. No. 10/622,677, dated Aug. 15, 2008.
Official Action for U.S. Appl. No. 10/622,677, dated Jun. 21, 2010.
Decision on Appeal for U.S. Appl. No. 10/622,677, dated May 1, 2014, 16 pages.
Notice of Allowance for U.S. Appl. No. 10/622,677, dated Aug. 1, 2014, 6 pages.
Official Action for U.S. Appl. No. 12/785,184, dated May 21, 2012 5 pages.
Official Action for U.S. Appl. No. 12/785,184, dated Aug. 13, 2012 5 pages.
Notice of Allowance for U.S. Appl. No. 12/785,184, dated Jan. 10, 2013 5 pages.

* cited by examiner

Rail Car Unload Hopper
200
208
Filter - Receiver
212
220
204
100 HP
Vacuum Blower
Bin Vent Filter
224
216
Iron Hopper,
12' Diameter,
3000 ft3
228
236
30 HP Blower
232
240
244a
Coal Pipe 1
Coal Pipe 2
244b

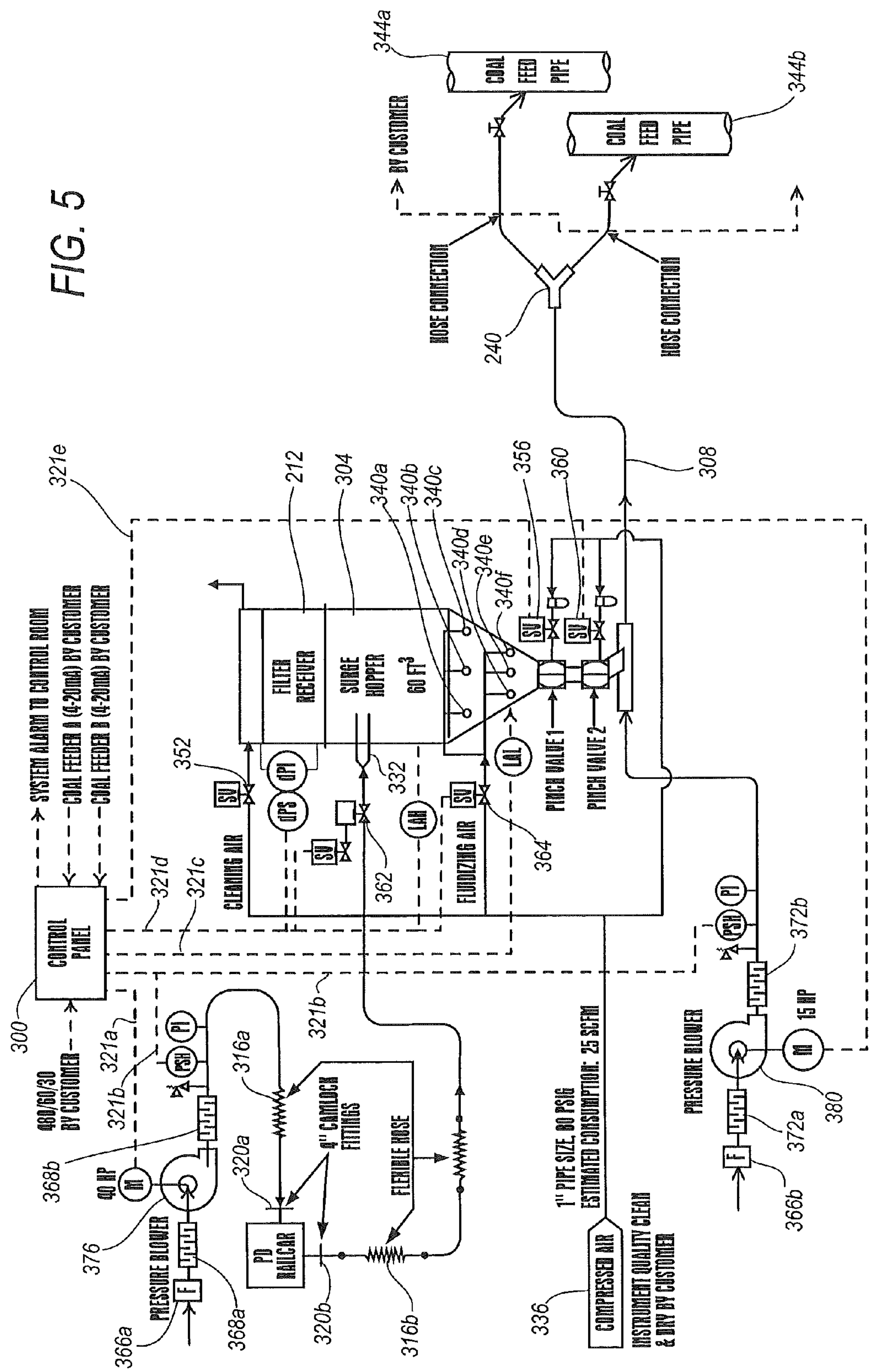
FIG. 5
CONTROL PANEL
FILTER RECEIVER
SURGE HOPPER
60 FT³
CLEANING AIR
FLUIDIZING AIR
PINCH VALVE 1
PINCH VALVE 2
PRESSURE BLOWER
40 HP
15 HP
PD RAILCAR
4" CAMLOCK FITTINGS
FLEXIBLE HOSE
COMPRESSED AIR
1" PIPE SIZE, 80 PSIG
ESTIMATED CONSUMPTION: 25 SCFM
INSTRUMENT QUALITY CLEAN & DRY BY CUSTOMER
480/60/30 BY CUSTOMER
SYSTEM ALARM TO CONTROL ROOM
COAL FEEDER A (4-20mA) BY CUSTOMER
COAL FEEDER B (4-20mA) BY CUSTOMER
HOSE CONNECTION
HOSE CONNECTION
BY CUSTOMER
COAL FEED PIPE
COAL FEED PIPE

LOW SULFUR COAL ADDITIVE FOR IMPROVED FURNACE OPERATION

CROSS REFERENCE TO RELATED APPLICATIONS

The present application is a continuation of U.S. Continuation application Ser. No. 10/622,677, filed Jul. 18, 2003, which is a continuation of and claims the benefits of each of the following: copending U.S. patent application Ser. No. 09/893,079, filed Jun. 26, 2001, now U.S. Pat. No. 6,729,248, issued May 4, 2004; U.S. Divisional application Ser. No. 10/209,083, filed Jul. 30, 2002, now U.S. Pat. No. 7,332,002, issued Feb. 19, 2008; and U.S. Divisional application Ser. No. 10/209,089, filed Jul. 30, 2002, now U.S. Pat. No. 6,773,471, issued Aug. 10, 2004, all of which are entitled "Low Sulfur Coal Additive For Improved Furnace Operation"; all of which directly or indirectly claim the benefit of U.S. Provisional Application Ser. No. 60/213,915, filed Jun. 26, 2000, and entitled "Low-Cost Technology to Improve Operation of Cyclone Furnaces Firing Low-Sulfur Western Coals", each of which are incorporated herein by reference in their entirety.

FIELD OF THE INVENTION

The present invention relates generally to coal additives for furnaces and specifically to coal additives for slag-type furnaces.

BACKGROUND OF THE INVENTION

Coal is widely recognized as an inexpensive energy source for utilities. Coal-fired furnaces are used to generate steam for power production and industrial processes. Coal-fired furnaces have many different configurations and typically include a plurality of combustors. In one furnace configuration, a slag layer forms on a surface of the burner and captures the coal particles for combustion. Such a furnace will be hereafter referred to as a "slag type furnace."

An example of a combustor 100 for a slag-type furnace is depicted in FIG. 1. The depicted combustor design is used in a cyclone furnace of the type manufactured by Babcock and Wilcox. Cyclone furnaces operate by maintaining a sticky or viscous layer of liquid (melted) ash (or slag) (not shown) on the inside cylindrical walls 104 of the cyclone combustion chamber 108. Coal is finely crushed (e.g., to minus ¼ inch top size), entrained in an airstream, and blown into the combustor end 112 of the cyclone combustor or combustor 100 through coal inlet 116. Combustion air (shown as primary air 120, secondary air 124, and tertiary air 128) is injected into the combustion chamber 108 to aide in combustion of the coal. The whirling motion of the combustion air (hence the name "cyclone") in the chamber 108 propels the coal forward toward the furnace walls 104 where the coal is trapped and burns in a layer of slag (not shown) coating the walls. The re-entrant throat 140 (which restricts escape of the slag from the chamber 108 via slag tap opening 144) ensures that the coal particles have a sufficient residence time in the chamber 108 for complete combustion. The slag and other combustion products exit the chamber 108 through the slag tap opening 144 at the opposite end from where the coal was introduced. The molten slag (not shown) removed from the chamber 108 flows to a hole (not shown) in the bottom of the boiler where the slag is water-quenched and recovered as a saleable byproduct. The ash composition is important to prevent the slag from freezing in the hole and causing pluggage. To melt ash into slag at normal combustion temperatures (e.g., from about 2600 to about 3000° F.), slag-type furnaces, such as cyclones, are designed to burn coals whose ash contains high amounts of iron and low amounts of alkali and alkaline earth metals (as can be seen from FIG. 2). Iron both reduces the melting temperature of the ash and increases the slag viscosity at these temperatures due to the presence of iron aluminosilicate crystals in the melt.

High sulfur content in coal, particularly coals from the eastern United States, has allegedly caused significant environmental damage due to the formation of sulfur dioxide gas. As a result, utilities are turning to low sulfur western coals, particularly coals from the Powder River Basin, as a primary feed material. As used herein, "high sulfur coals" refer to coals having a total sulfur content of at least about 1.5 wt. % (dry basis of the coal) while "low sulfur coals" refer to coals having a total sulfur content of less than about 1.5 wt. % (dry basis of the coal) and "high iron coals" refer to coals having a total iron content of at least about 10 wt. % (dry basis of the ash) while "low iron coals" refer to coals having a total iron content of less than about 10 wt. % (dry basis of the ash). As will be appreciated, iron and sulfur are typically present in coal in the form of ferrous or ferric carbonites and/or sulfides, such as iron pyrite.

The transition from high sulfur (and high iron) to low sulfur (and low iron) coals has created many problems for slag-type coal furnaces such as cyclone furnaces. When low-sulfur western coals, with low iron and high (i.e., at least about 20 wt. % (dry basis of the ash)) alkali (e.g., calcium) contents, are fired in these boilers, the viscosity of the slag is too low, causing less retained bottom ash (or a higher amount of entrained coal and ash particulates in the offgas from combustion), degraded performance of particulate collectors (due to the increased particulate load) and therefore a higher incidence of stack opacity violations and increased fuel and maintenance costs, less reliable slag tapping, the occurrence of flames in the main furnace, high furnace exit temperatures (or sprays), and increased convective pass fouling. As shown in FIG. 3, in the operating range noted above high sulfur coals (denoted as Illinois coal) form slag having a moderate to high viscosity and therefore produce a relatively thick slag layer on the surface of the furnace while low sulfur coals (denoted as PRB coals) form a slag having a very low viscosity and therefore produce thin, low viscosity slag layers. As a result, utilities using slag-type furnaces, such as cyclone furnaces, have, through switching feed materials, realized lower sulfur dioxide emissions but at the same time have produced a host of new operational problems.

Techniques that have been employed to provide improved slag characteristics for high sulfur eastern coals have proven largely ineffective for low sulfur coals. For example, limestone has been used by utilities as a high sulfur coal additive to adjust the slag viscosity to the desired range for the furnace operating temperature. The calcium in the limestone is widely believed to be the primary reason for the improved performance. Low sulfur western coals, in contrast, already have relatively high calcium contents and therefore experience little, if any, viscosity adjustment when limestone is added to the coal feed to the furnace.

Another possible solution is the addition of iron pellets (which typically include at least predominantly nonoxidized iron) to the furnace to assist in slag formation and coal combustion. Iron oxide fluxes high-silica glass, while reduced forms of iron (FeO or Fe-metal) flux calcium-rich glass. In the presence of burning coal particles, iron exists primary in reduced form. The use of iron has been recommended to solve slag-tapping problems in cyclone furnaces by adding commercially available iron pellets, which are very expensive. The pellets have a further disadvantage of forming pools of reduced iron that can be very corrosive to metal or refractory surfaces exposed to the iron and/or of being an ineffective fluxing agent. Therefore, iron fluxes have failed to achieve long term acceptance in the utility industry.

Another possible solution is to blend high iron coals with the western coals to increase the iron content of the coal feed. Blended coals are far from a perfect solution. High iron coals (or "kicker" coals) are often much more expensive coals than western coals. High iron coals also have high sulfur levels because the predominant form of iron in such coals is iron sulfide (or iron pyrite). Blended coals suffer from increased operating costs and increased sulfur dioxide emissions, which can in certain cases exceed applicable regulations.

Another possible solution is to grind the coal going into the cyclone furnace much finer and supply additional air to increase the percentage of combustion that occurs for coal particles in flight. This option requires expensive modifications or replacement of grinding equipment and is counter to the original design and intent of the cyclone furnace. The technique further decreases boiler efficiency and increases the auxiliary power required to operate the boiler. The use of fine grinding has thus proven to be an inadequate solution to the problem in most cases.

SUMMARY OF THE INVENTION

The various methods and compositions of the present invention can provide a fluxing agent or additive that can be contacted with the coal feed to or in a combustion chamber of a furnace to produce a slag layer having one or more desirable characteristics, such as viscosity and thickness. The methods and compositions are particularly effective for a cyclone furnace of the type illustrated in FIG. 1.

In one embodiment, a method is provided for combusting coal that includes the steps of:

(a) providing a coal-containing feed material to a coal combustion chamber;

(b) contacting the feed material with an iron-containing additive; and (c) melting at least a portion of the coal-containing feed material and iron-containing additive to form a slag layer on at least a portion of a surface of the combustion chamber, whereby coal in the coal-containing feed material is captured by the slag layer and combusted. As noted below, the additive permits slag-type furnaces to burn low iron, high alkali, and low sulfur coals by enhancing the slagging characteristics of the ash.

The coal-containing feed material has coal as the primary component. As used herein, "coal" refers to macromolecular network comprised of groups of polynuclear aromatic rings, to which are attached subordinate rings connected by oxygen, sulfur and aliphatic bridges. Coal comes in various grades including peat, lignite, sub-bituminous coal and bituminous coal. In one process configuration, the coal includes less than about 1.5 wt. % (dry basis of the coal) sulfur while the coal ash contains less than about 10 wt. % (dry basis of the ash) iron as $Fe_2O_3$, and at least about 15 wt. % calcium as CaO (dry basis of the ash). The material is preferably in the form of a free flowing particulate having a $P_{90}$ size of no more than about 0.25 inch.

The coal combustion chamber is part of a coal-fired furnace such as a slag-type furnace and any industrial boiler that produces a molten, liquid ash residue (known to the industry as "wet-bottom" boilers). The furnace can be of any configuration, with a slag-type furnace being preferred and a cyclone furnace being even more preferred.

The iron-containing additive can be in any form and any composition so long as iron is present in sufficient amounts to flux effectively the feed material. The iron can be present in any form(s) that fluxes under the conditions of the furnace, including in the forms of ferrous or ferric oxides and sulfides. In one formulation, iron is present in the form of both ferric and ferrous iron, with ferric and ferrous iron oxides being preferred. Preferably, the ratio of ferric (or higher valence) iron to ferrous (or lower valence) iron is less than 2:1 and more preferably ranges from about 0.1:1 to about 1.95:1, or more preferably at least about 33.5% of the iron in the additive is in the form of ferrous (or lower valence) iron and no more than about 66.5% of the iron in the additive is in the form of ferric (or higher valence) iron. In a particularly preferred formulation, at least about 10% of the iron in the additive is in the form of wustite. "Wustite" refers to the oxide of iron of low valence which exist over a wide range of compositions (e.g., that may include the stoichiometric composition FeO) as compared to "magnetite" which refers to the oxide of iron of intermediate or high valence which has a stoichiometric composition of $Fe_2O_3$ (or $FeO.Fe_2O_3$). It has been discovered that the additive is particularly effective when wustite is present in the additive. While not wishing to be bound by any theory, it is believed that the presence of iron of low valence levels (e.g., having a valence of 2 or less) in oxide form may be the reason for the surprising and unexpected effectiveness of this additive composition.

While not wishing to be bound by any theory, it is believed that the presence of iron in the calcium aluminosilicate slags of western coals causes a decrease in the melting temperature of the ash and crystal formation in the melt when a critical temperature ($T_{CV}$) is reached. These crystals change the flow characteristics of the slag causing the slag to thicken before the slag can flow. This phenomenon is known as "yield stress" and is familiar to those skilled in the art of non-Newtonian flow. Thicker slag allows the slag to capture and hold more coal particles. Therefore, fewer coal particles escape the combustor without being burned.

In a preferred process configuration, the additive is in the form of a free-flowing particulate having a $P_{90}$ size of no more than about 300 microns (0.01 inch) and includes at least about 50 wt. % iron. Compared to iron pellets, the relatively small particle size of the additive reduces significantly the likelihood of the formation of pools of reduced iron that can be very corrosive to metal or refractory surfaces exposed to the iron. It is believed that the reason for pooling and poor fluxing has been the relatively large sizes of iron pellets (typically the $P_{90}$ size of the pellets is at least about 0.25 inch (6350 microns)) in view of the short residence times of the pellets in the combustion chamber. Such pellets take longer to heat and therefore melt and act as a flux. This can cause the pellets to pass or tumble through the chamber before melting has fully occurred. The increase surface area of the additive further aids in more effective fluxing as more additive reaction surface is provided.

Preferably, the additive further includes a mineralizer, such as zinc oxide. While not wishing to be bound by any theory, it is believed that the zinc increases the rate at which iron fluxes with the coal ash. "Ash" refers to the residue remaining after complete combustion of the coal particles. Ash typically includes mineral matter (silica, alumina, iron oxide, etc.) Zinc is believed to act as a mineralizer. Mineralizers are substances that reduce the temperature at which a material sinters by forming solid solutions. This is especially important where, as here, the coal/ash residence time in the combustor is extremely short (typically less than about one second). Preferably, the additive includes at least about 1 wt. % (dry basis) mineralizer and more preferably, the additive includes from about 3 to about 5 wt. % (dry basis) mineralizer. Mineralizers other than zinc oxides include calcium, magnesium or manganese flourides or sulfites and other compounds known to those in the art of cement-making. Preferably, the additive includes no more than about 0.5 wt. % (dry basis) sulfur, more preferably includes no more than about 0.1 wt. % (dry basis) sulfur, and even more preferably is at least substantially free of sulfur.

The injection rate of the iron-containing additive to the chamber depends, of course, on the combustion conditions and the chemical composition of the coal feed and additive. Typically, the injection rate of the iron-containing additive into the combustion chamber ranges from about 10 to about 50 lb/ton coal and more typically from about 10 to about 20 lb/ton coal.

After combination with the additive, the coal-containing feed material typically includes:

(a) coal; and (b) an additive that includes iron in an amount of at least about 0.5 wt. % (dry basis) and mineralizer in an amount of at least about 0.005 wt. % (dry basis).

The methods and additives of the present invention can have a number of advantages compared to conventional systems. The additive(s) can provide a slag layer in the furnace having the desired viscosity and thickness at a lower operation temperature. As a result, there is more bottom ash to sell, a relatively low flyash carbon content, more effective combustion of the coal, more reliable slag tapping, improved boiler heat transfer, and a relatively low amount of entrained particulates in the offgas from combustion, leading to little or no degradation in performance of particulate collectors (due to the increased particulate load). The boiler can operate at lower power loads (e.g., 60 MW without the additive and only 35 MW with the additive as set forth below) without freezing the slag tap and risking boiler shutdown. The operation of the boiler at a lower load (and more efficient units can operate at higher load) when the price of electricity is below the marginal cost of generating electricity, can save on fuel costs. The additive can reduce the occurrence of flames in the main furnace, lower furnace exit temperatures (or steam temperatures), and decrease the incidence of convective pass fouling compared to existing systems. The additive can have little, if any, sulfur, thereby not adversely impacting sulfur dioxide emissions. These and other advantages will become evident from the following discussion.

BRIEF DESCRIPTION OF THE DRAWINGS

FIG. 5 is a second embodiment of a flow schematic of a process using an additive according to one embodiment of the present invention;

DETAILED DESCRIPTION

The Additive

Figure 1:
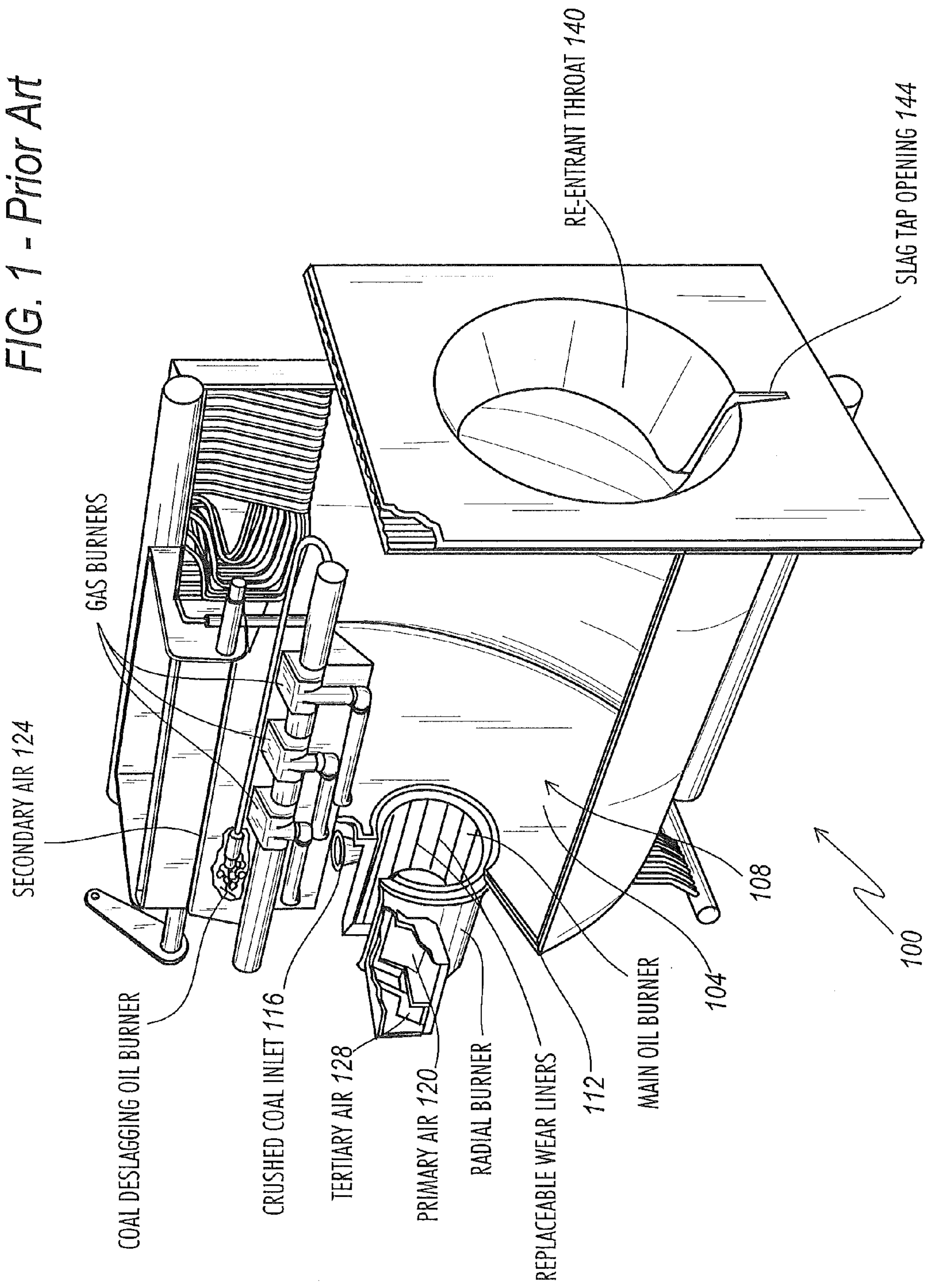
FIG. 1 is a cutaway view of a combustor of a cyclone furnace.
Figure 2:
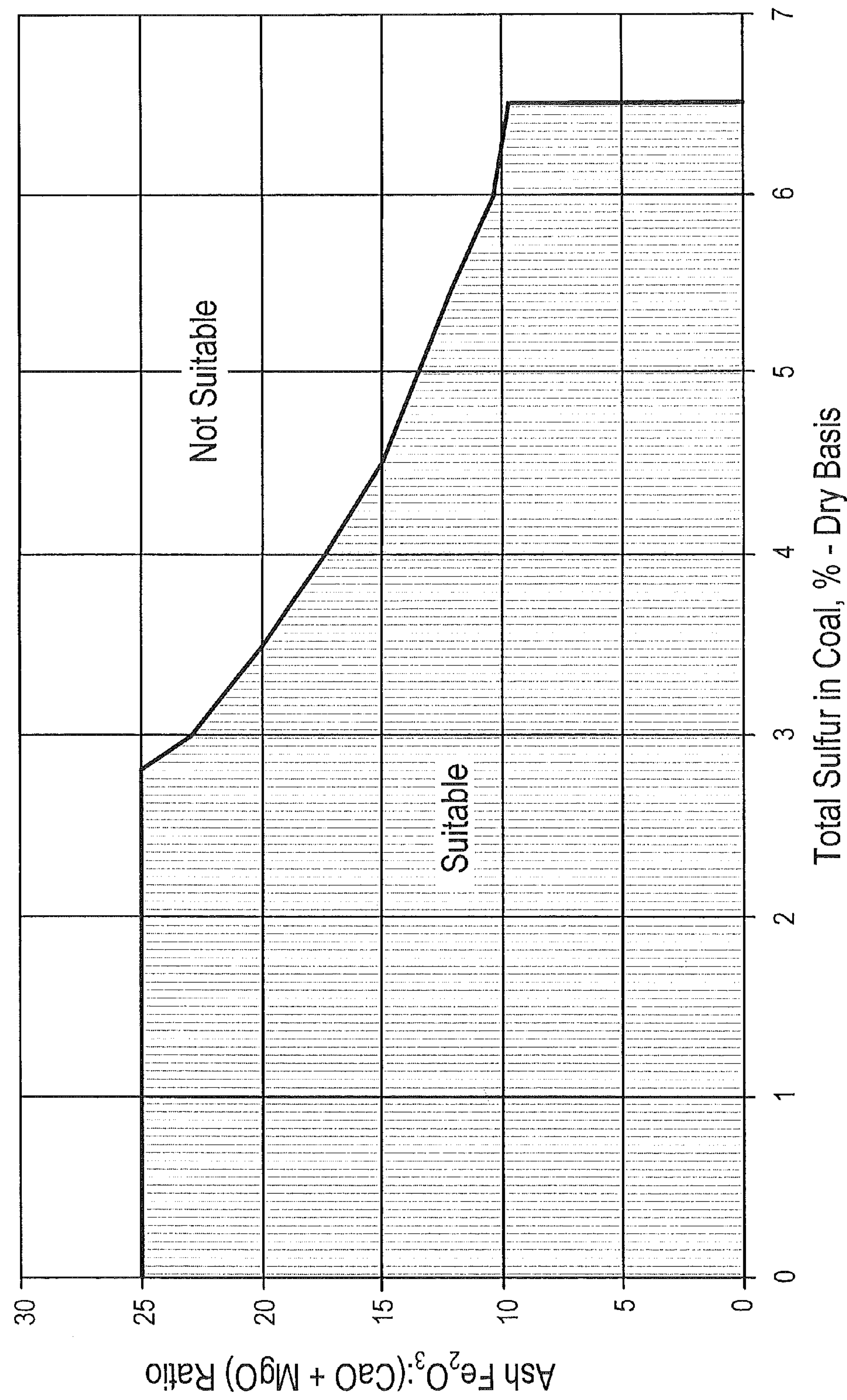
FIG. 2 is a graph of ash $Fe_2O_3$:(CaO+MgO) content ratio versus total sulfur in coal (wt percent-dry basis) showing coals suitable for a cyclone furnace.
Figure 3:
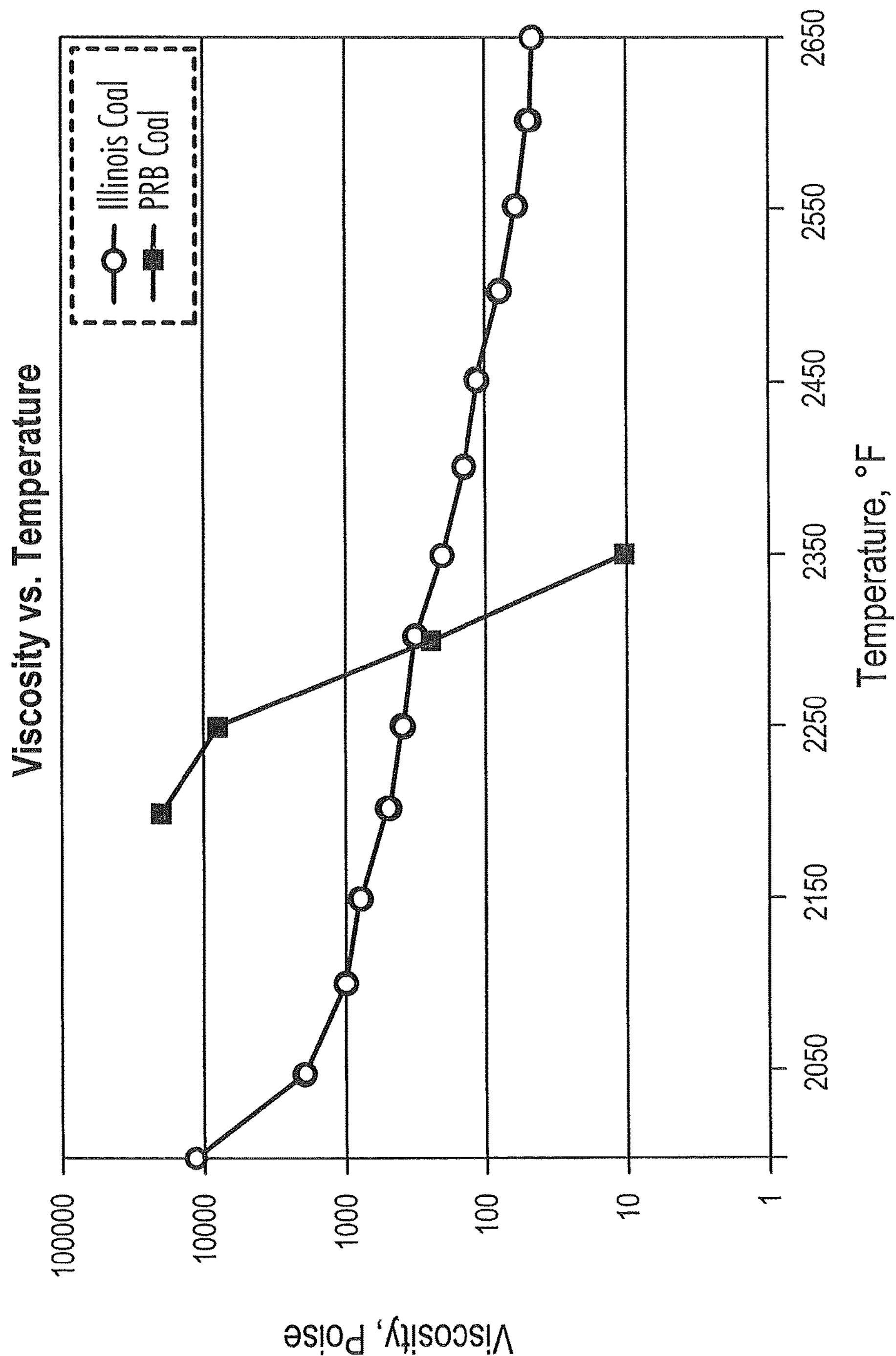
FIG. 3 is a graph plotting slag viscosity versus operating temperature for high and low sulfur coals.

As noted, the additive contains iron and preferably a mineralizing agent, such as zinc. The iron and mineralizing agent can be in any form, such as an oxide or sulfide, so long as the iron and mineralizing agent will be reactive under the operating conditions of the furnace. Preferably, the additive includes at least about 50 wt. % (dry basis) iron and more preferably at least about 80 wt. % (dry basis) iron and even more preferably from about 70 to about 90 wt. % (dry basis) iron. Preferably, the ratio of ferric (or higher valence) iron to ferrous (or lower valence) iron is less than 2:1 and even more preferably ranges from about 0.1:1 to about 1.9:1, or more preferably at least about 33.5% and even more preferably at least about 35% and even more preferably at least about 40% of the iron in the additive is in the form of ferrous (or lower valence) iron and no more than about 65% of the iron in the additive is in the form of ferric (or higher valence) iron. In a particularly preferred formulation, at least about 10%, more preferably at least about 15% of the iron is in the form of wustite, and even more preferably from about 15 to about 50% of the iron is in the form of wustite. Preferably, the additive includes at least about 0.1 wt. % (dry basis) mineralizing agent and more preferably from about 0.5 to about 15 wt. % (dry basis) mineralizing agent, even more preferably from about 2 to about 8 wt. % (dry basis), and even more preferably from about 3 to about 5 wt. % (dry basis) mineralizing agent. Due to the formation of sulfur oxides, the additive typically includes little, if any, sulfur. The additive is preferably in the form of a free-flowing particulate and has a relatively fine particle size. Preferably, the $P_{90}$ size of the additive is no more than about 300 microns, more preferably no more than about 150 microns, and even more preferably no more than about 75 microns.

The additive can be manufactured by a number of processes. For example, the additive can be the particles removed by particulate collection systems (e.g., by electrostatic precipitators or baghouses) from offgases of steel or iron manufacturing or mill scale fines. Preferably, the additive is the collected fines (flue dust and/or electrostatic precipitator dust) from the offgas(es) of a blast furnace, Basic Oxygen Furnace (BOF), or electric arc furnace dust such as used in the iron or steel making industry. In such materials, the iron and mineralizer are typically present as oxides. The additive can also be a sludge containing iron plus oils and greases produced during metal finishing operations. Oils and greases have the advantages of preventing fugitive emissions during handling and shipping and replacing the heat input requirement from the coal in the boiler and thus reduce fuel costs for producing electricity. Typically, such additives will contain from about 0.1 to about 10 wt. %

(dry basis) greases and oils. Another source of iron-containing material is red mud from the bauxite mining industry.

Transportation of the Additive

Because of the small size of much of the available byproduct material, handling and transportation of the material can result in high fugitive dust emissions. It is therefore desirable to treat the material to provide acceptable dusting characteristics. The treatment can take place at the source of the material, at a transportation terminal, or at the plant site. There are several different types of treatment including:

(i) Adding water, typically in a ratio of from about 100:1 to about 1000:1 parts material to part water, to the material. Adding water to the material forms a cohesive layer on the wetted surface after drying of the material, which will substantially eliminate fugitive emissions from the pile.

(ii) The hydrophilic nature of the iron materials also means that they can be mixed as a slurry and made into any form desirable for shipping. Briquettes of the material can be made to decrease dust emissions during handling.

(iii) Organic and/or inorganic adhesives can be added to the slurried material to increase the cohesiveness of the final material. Typically, such adhesives are added in the ratio of about 100:1 to about 1000:1 parts material to part adhesive. Laboratory tests have shown that xanthan gum and phosphoric acid lead to very cohesive agents.

(iv) Spraying with conventional dust suppression chemicals such as calcium lignosulfonate can treat the material to prevent handling problems. This material is commonly used to reduce coal dust emissions and can be applied at a range of concentrations of from about 1 to about 10 wt. % (dry basis) of the additive at a low cost.

Use of the Additive

The additive can be contacted with the coal feed in a number of different ways. For example, the additive can be mixed with the coal feed at a shipping terminal, added to the coal reclaim belt, added to the coal bunkers, and/or added to the coal feed and/or primary air streams using an eductor to aspirate the additive.

Figure 9:
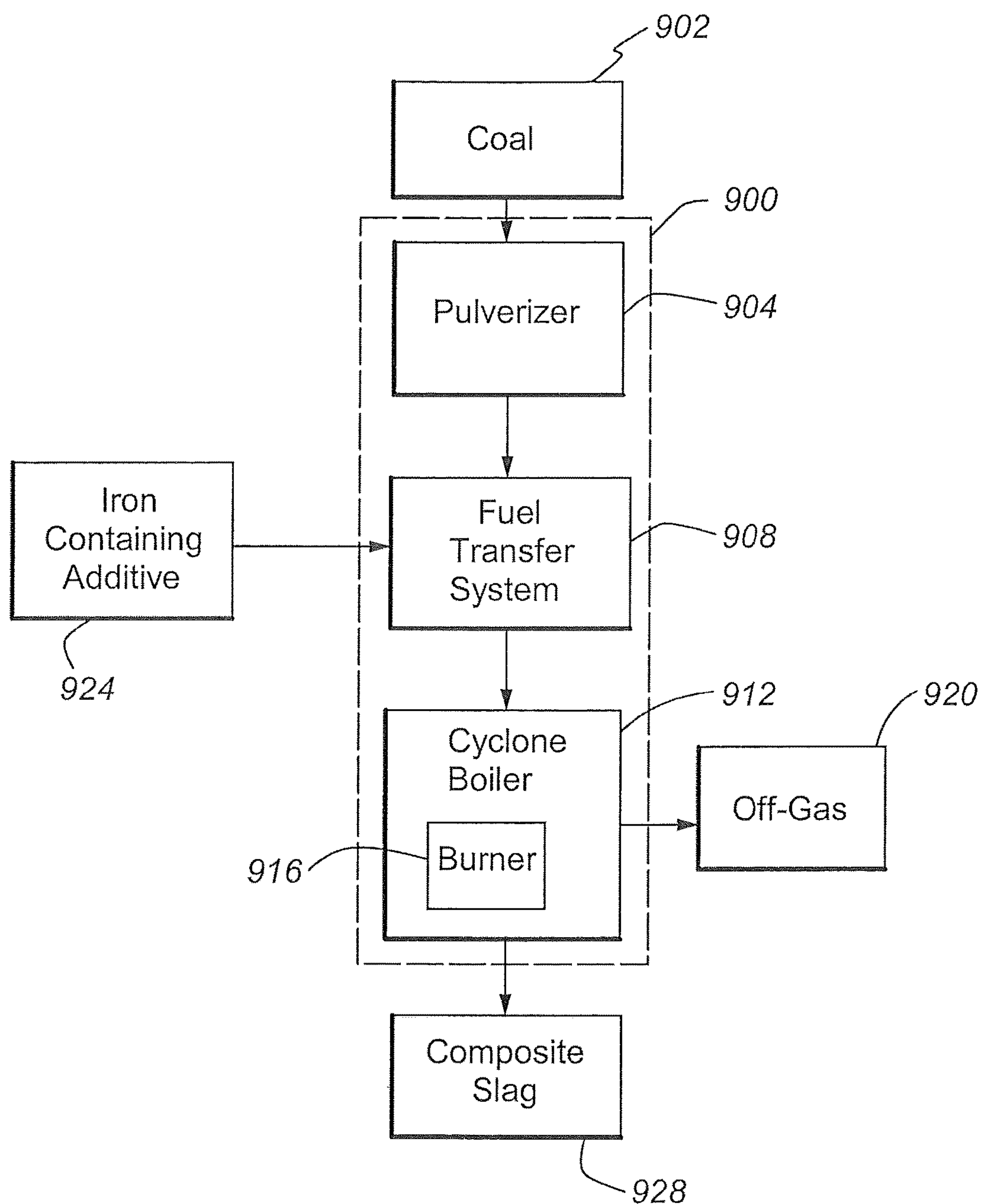
FIG. 9 is a block diagram depicting a boiler system according to an embodiment of the present invention.

FIG. 9 depicts a boiler system 900 according to an embodiment of the present invention. The system 900 includes a pulverizer 904 to crush the coal 902 to the desired size. The crushed coal is provided to a fuel transfer system 908, in which the iron-containing additive is combined with the crushed coal. The fuel transfer system 908 pneumatically transports the mixture of iron-containing additive and crushed coal to the cyclone boiler 912. The mixture is introduced into a burner 916 in the cyclone boiler 912. In the cyclone boiler 912, the coal is trapped and burns in a layer of slag 928 coating the walls. The slag 928 and other combustion products, such as off-gas 920, exit the cyclone boiler 912.

Figure 4:
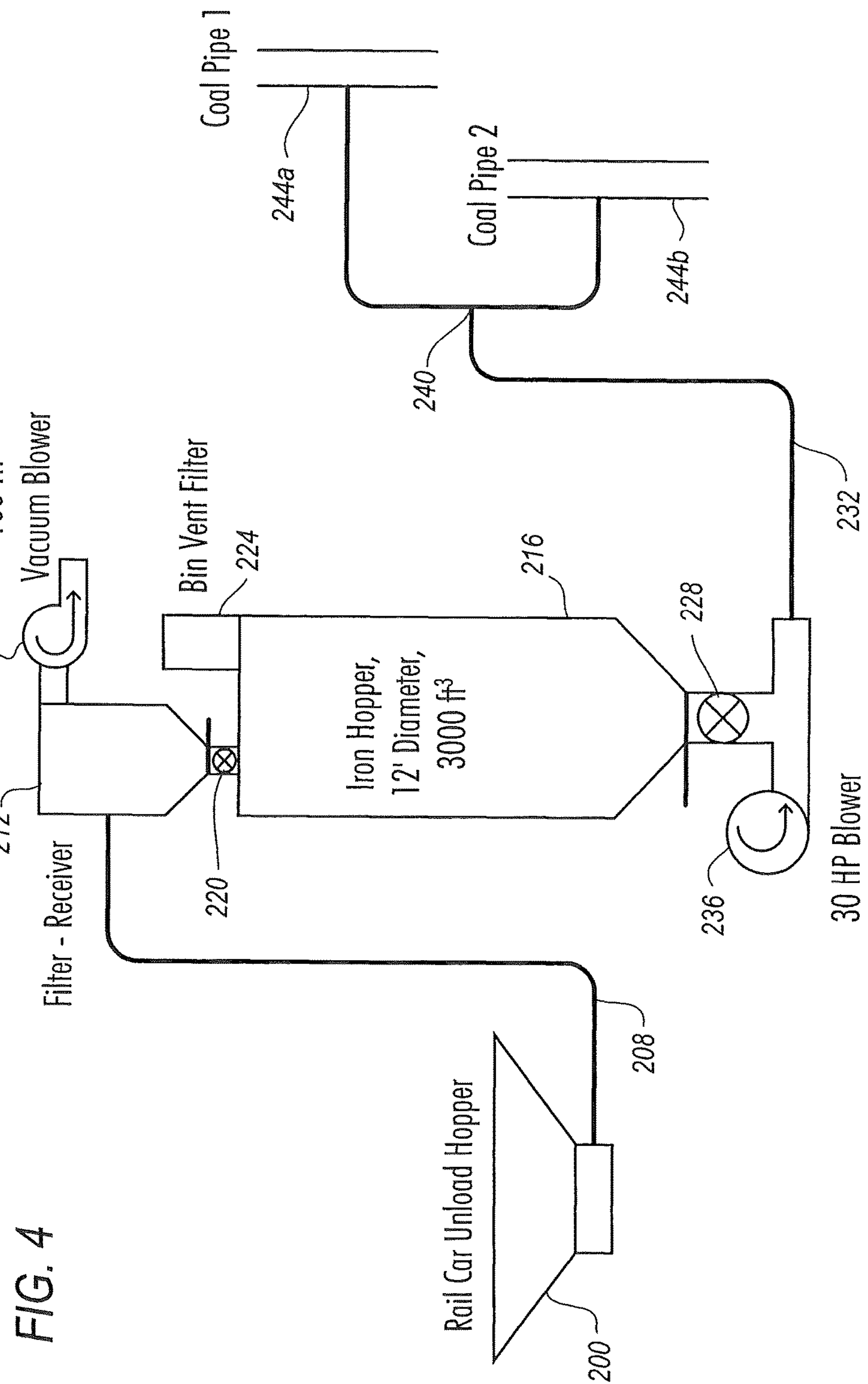
FIG. 4 is a first embodiment of a flow schematic of a process using an additive according to one embodiment of the present invention.

Referring to FIG. 4, a first method for adding the additive to the combustion process will be discussed. The additive is transported pneumatically from a hopper 200 of a covered railcar or truck using a vacuum blower 204 and transport line 208. The additive-containing gas stream passes through a filter receiver 212, which collects the additive as a retentate. The additive drops from the filter surface into the hopper 216 via duct 220. A bin vent filter 224 prevents pressure build up in the hopper 216 and accidental release of the additive from the hopper 216 into the ambient atmosphere. A metered valve 228 permits the additive to flow at a desired rate (typically from about 5 to about 2000 lb./min.) into a feed line 232, where the additive is combined with pressurized air (via blower 236). The additive is entrained in the air and transported through splitter 240 and to a number of coal feed pipes 244*a,b*. The additive/air stream is combined with the coal/air stream passing through the coal feed pipes 244*a,b* to form feed mixtures for the furnace. The feed mixtures 244*a,b* are then introduced into the combustors via coal inlet 116 (FIG. 1).

The additive can be highly cohesive and have a tendency to form dense, hard deposits in the above-noted delivery system. A flow aid and/or abrasive material can be added to the material to aid in its handling. As used herein, a "flow aid" refers to any substance that reduces particle-to-particle attraction or sticking, such as through electrostatic or mechanical means. Preferred flow aids include ethylene glycol, "GRIND AIDS" manufactured by WR Grace Inc. The preferred amount of flow aid in the additive is at least about 1 and no more than about 10 wt. % (dry basis) and more preferably at least about 1 and no more than about 5 wt. % (dry basis). Abrasive materials can also be used to prevent deposit formation and/or life. As will be appreciated, abrasive materials will remove deposits from the conduit walls through abrasion. Any abrasive material may be employed, with preferred materials being sand, blasting grit, and/or boiler slag. The preferred amount of abrasive material in the additive is at least about 2 and no more than about 20 wt. % (dry basis) and more preferably at least about 2 and no more than about 10 wt. % (dry basis).

Using the additive, the slag layer in the coal-burning furnace typically includes:

(a) at least about 5 wt. % (dry basis) coal;

(b) iron in an amount of at least about 15 wt. % (dry basis); and (c) at least one mineralizer in an amount of at least about 1 wt. % (dry basis).

When the additive is employed, the slag layer in the combustor is in the form of a free-flowing liquid and typically has a viscosity of at least about 250 Poise.

Due to the presence of minerals in the feed material, the slag layer in the combustor can include other components. Examples include typically:

(d) from about 20 to about 35 wt. % (dry basis) silica oxides or $SiO_2$;

(e) from about 13 to about 20 wt. % (dry basis) aluminum oxides or $Al_2O_3$;

(f) from about 0 to about 2 wt. % (dry basis) titanium oxides or $TiO_2$;

(g) from about 18 to about 35 wt. % (dry basis) calcium oxides or CaO; and (h) from about 3 to about 10 wt. % (dry basis) magnesium oxides or MgO.

The solid byproduct of the coal combustion process is typically more saleable than the byproduct in the absence of the additive. The solid byproduct is typically harder than the other byproduct and has a highly desirable composition. Typically, the byproduct includes:

(a) at least about 20 wt. % (dry basis) silica;

(b) iron in an amount of at least about 15 wt. % (dry basis);

(c) mineralizer in an amount of at least about 1 wt. % (dry basis); and (d) at least about 13 wt % (dry basis) aluminum.

The byproduct can further include one or more of the compounds noted above.

A second embodiment of a method for adding the additive to the combustion process is depicted in FIG. 5. Like reference numbers refer to the same components in FIG. 4. The process of FIG. 5 differs from the process of FIG. 4 in a number of respects. First, a controller 300 controls the feed rate of the additive from the hopper 304 to the transport conduit 308 and various other unit operations via control lines 321*a-e*. For additive feed rate, the controller 300 can use feed forward and/or feedback control. The feed forward control would be based upon the chemical analysis of the coal being fed from to the furnace. Typically, the chemical analysis would be based on the iron and/or ash content of the coal feed. Feedback control could come from a variety of measured characteristics of boiler operation and downstream components such as: LOI (flue gas $O_2$ and CO with a higher $O_2$ and/or CO concentration indicating less efficient combustion) as measured by an on-line furnace analyzer (not shown), carbon content in ash as determined from ash samples extracted from the flue gas or particle collector (e.g., electrostatic precipitator hopper) (the carbon content is indirectly proportional to combustion efficiency), furnace exit gas temperature (which will decrease with less coal carryover from the cyclones, slag optical characteristics such as emissivity or surface temperature (the above noted additive will desirably reduce emissivity and increase boiler heat transfer), slag tap flow monitoring to assure boiler operability, and stack opacity (a higher stack opacity equates to a less efficient combustion and vice versa). The controller 300 further monitors other boiler performance parameters (e.g., steam temperature and pressure, $NO_2$ emissions, et al., through linkage to a boiler digital control system or DCS. In the event of system malfunction (as determined by a measured parameter falling below or exceeding predetermined threshholds in a look-up table), the controller 300 can forward an alarm signal to the control room and/or automatically shut down one or more unit operations.

The additive is removed from the railcar 200 via flexible hoses 316*a,b* with camlock fittings 320*a,b* using a pressured airstream produced by pressure blower 324. The pressurized airstream entrains the additive in the railcar and transports the additive via conduit 328 to the surge hopper 304 and introduced into the hopper in an input port 332 located in a mid-section of the hopper 304.

Compressed air 336 is introduced into a lower section of the hopper 304 via a plurality of air nozzles 340*a-f*. The additive bed (not shown) in the hopper 304 is therefore fluidized and maintained in a state of suspension to prevent the additive from forming a cohesive deposit in the hopper. The bed is therefore fluidized during injection of the additive into the coal feed lines 344*a,b*.

The compressed air 336 can be used to periodically clean the hopper 304 and filter 348 by opening valves 352, 356, and 360 and closing valves 362 and 364.

Filters 366*a,b* are located at the inlet of the blowers 376 and 380 to remove entrained material. Mufflers 368*a,b* and 372*a,b* are located at the inlet and outlet of the blowers 376 and 380 for noise suppression.

Finally, a number of abbreviations in FIG. 5 will be explained. "M" refers to the blower motors and an on/off switch to the motors, "PSH" to an in-line pressure sensor that transmits digital information to the controller 300, "PI" to a visual in-line pressure gauge, "dPS" to a differential pressure switch which transmits a digital signal to the controller indicating the pressure drop across filter receiver 212 (which compares the digital signal to a predetermined maximum desired pressure drop to determine when the filter receiver 212 requires cleaning), "dPI" to a visual differential pressure gauge measuring the pressure drop across the filter receiver 212, "LAH" to an upper level detector that senses when the additive is at a certain (upper) level in the hopper and transmits an alarm signal to the controller 300, "LAL" to a lower level detector that senses when the additive is at a certain (lower) level in the hopper and transmits an alarm signal to the controller 300, and "SV" to a solenoid valve that is actuated by an electrical signal from the controller 300.

In yet another embodiment, the use of inexpensive iron-bearing byproduct material is used to provide a less costly fix to the problems arising from using low sulfur coals in cyclone boilers. In addition to being less expensive, the physical characteristics of these materials provide additional benefits that potentially make them more effective than the other sources of iron. However, to provide an effective system for enhancing combustion in cyclone furnaces, there are several important steps in this process including proper selection of candidate material, treatment of the dust to allow handling and shipping, blending with the coal, and control of the feed rate.

This process is applicable for use in the coal-fired electric utility industry. It is specifically of use for utilities that employ cyclone furnaces to fire low iron, high-alkali coals such as those found in the western regions of the United States. The invention may also be extended by those skilled in the art to apply to any industrial boiler that produces a molten, liquid ash residue (known to the industry as "wet-bottom" boilers).

As noted previously, cyclone furnaces are used to generate steam for power production and industrial processes. Such a furnace is diagramed in FIG. 1. The furnaces operate by maintaining a sticky layer of fluid ash (slag) on the inside walls of the cyclone combustor. Coal is crushed to a ¼-inch top size and blown into the burner end of the cyclone combustor. The whirling motion of the combustion air (hence the name "cyclone") propels the coal toward the furnace walls where the coal is caught like flies in flypaper and burns in the slag. Products of combustion exit the cyclone through an opening called the re-entrant throat at the opposite end from where the coal was introduced. Molten slag flows slowly through a spout to a hole in the bottom of the boiler where it is water-quenched and recovered as a saleable byproduct. The ash composition is critical to prevent the slag from freezing in the hole and causing pluggage. Therefore, cyclone furnaces were located in the mid-west to burn local high-sulfur, high-iron coals. Over time, cyclone furnaces have been converted to burn low-sulfur coal to satisfy environmental regulations limiting $SO_2$ emissions.

When certain high-calcium, low-sulfur coals from the Powder River Basin of Montana and Wyoming are burned in these furnaces, the cyclones do not develop a thick enough layer of sticky slag and the coal is not caught. This poor slag coating leads to unburned coal, degraded performance of particulate collectors (leading to stack opacity violations), and increased fuel and maintenance costs. The sticky slag layer can be reestablished by increasing the iron content of the coal.

It has been known for many years that iron is an effective fluxing agent for certain alumino-silicate glasses. Iron oxide fluxes high-silica glass, while reduced forms of iron (FeO or Fe-metal) flux calcium-rich glass. In the presence of burning coal particles, iron exists primarily in reduced form. Its use has been recommended to solve slag-tapping problems in cyclone furnaces by either blending in high iron coal or adding commercially available iron pellets, both of which are very expensive. The pellets (due to their size) have a further disadvantage of forming pools of reduced iron that can be very corrosive to metal or refractory surfaces exposed to it. Therefore, iron fluxes have never achieved long term acceptance in the utility industry. The use of inexpensive iron-bearing byproduct material is a novel means to provide a less costly and technically superior fix to this problem. In addition to being less expensive, the physical characteristics of these materials provide additional benefits that potentially make them more effective fluxes than commercially available sources of iron.

It is the object of this embodiment of the present invention to improve the performance of cyclone furnaces burning low-iron, high-alkali coals by enhancing the slagging characteristics of the ash through the addition of low-cost iron byproducts.

However, to provide an effective system for enhancing combustion in cyclone furnaces, there are several key steps in this process including:

proper selection of candidate material, treatment of the dust to allow handling and shipping, design of equipment to blend the flux with the coal, design of a control system to adjust additive feed rate.

It is the use of these byproducts of steel and iron manufacturing to flux the ash and improve the cyclone operation that is new and unique.

Several candidate byproduct materials are available to provide a source of iron that can be technically acceptable, such as:

Basic Oxygen Furnace (BOF) flue dust or precipitator fines

Blast Furnace flue dust

Electric Arc Furnace dust

Mill Scale fines

The materials are generally more than 50% iron by weight and are dusty or powdered. The preferred embodiment of this invention uses iron-bearing waste products containing more than 80% iron. Also, sludges containing iron plus oils and greases produced during metal finishing operations are suitable. These materials have the advantage of preventing fugitive emissions during handling and shipping. In addition, combustion of the oil or grease is also of value to boiler operators by replacing the heat input requirement from the coal and thus reducing fuel costs for producing electricity. An additional source of iron-bearing material is red mud from the bauxite mining industry.

The most favorable material was found to be flue dust and electrostatic precipitator dust from blast furnaces or BOFs. These are very fine dusts collected from iron or steel making furnaces. The material contains primarily Oxides of Iron and other metals in small amounts.

The elemental analysis of BOF flue dust was used to model its effect on PRB coal ash viscosity and the subsequent effect on the cyclone slag layer. The slag viscosity model showed that the BOF flue dust, when added to the coal to increase the ash iron percentage to 30% by weight, increased the thickness of the sticky layer in the cyclone by about 60%. The model also showed that the temperature at which the ash would have a viscosity of 250 poise would be reduced by at least 1001. This temperature is an important indicator of the minimum temperature at which the slag will flow. If the temperature at which the ash has a viscosity of 250 poise or lower is too high, then the slag will not flow to the slag tap on the floor of the boiler and will build up inside the boiler casing. This has been a problem on cyclone furnaces burning western coal at less than full design output.

Further, experience has shown that the presence of iron in the calcium aluminosilicate slags causes crystal formation in the melt when a critical temperature ($T_{cv}$) is reached. These crystals change the flow characteristics of the slag causing it to thicken before it can flow. This phenomenon is known as "yield stress" and is familiar to those skilled in the art of non-Newtonian flow. Thicker slag allows the slag to capture and hold more coal particles. Therefore, much fewer coal particles escape the combustor without being burned.

To Applicant's knowledge, the alternatives when burning Powder River Basin coal in cyclone furnaces are to blend other more expensive coals which have high iron, or to add iron pellets to the coal. High iron coals always have high sulfur because the predominant form of iron in coal is iron sulfide (pyrite). Therefore, coal blending is prohibited by law due to increased sulfur emissions. A third alternative is to grind the coal going into the cyclone furnace much finer in order to increase the percentage of combustion that occurs for coal particles in flight. This option requires expensive modifications or replacement of grinding equipment, but moreover, it is counter to the original design and intent of the cyclone furnace and seldom solves the problem. All of these alternatives are much more expensive than the use of this byproduct material. Also, the smaller particle size of the iron byproduct material is better than larger forms of iron because the surface area of the fluxing material in contact with the slag drives the speed of a fluxing reaction. Therefore, the larger surface area of the dust compared to ¼-inch pellets promotes fast and efficient fluxing.

Because of the small size of much of the available byproduct material, it can result in high fugitive dust emissions during handling and transportation. Therefore, a key step in this invention is to treat the material to provide acceptable dusting characteristics. The treatment can take place at the source of the material, at a transportation terminal, or at the plant site. There are several different types of treatment including:

Adding water to the material. Laboratory tests have confirmed that the BOF dust is hydrophilic and mixes well with water. Adding water to the material forms a cohesive layer on the wetted surface after drying, which will eliminate fugitive emissions from the pile.

The hydrophilic nature of the iron materials also means that they can be mixed as a slurry and made into any form desirable for shipping. Briquettes of the material can be made to decrease dust emissions during handling.

Chemicals can be added to the slurried material to increase the cohesiveness of the final material. Laboratory tests have shown that xanthum gum and phosphoric acid lead to very cohesive products.

Spraying with conventional dust suppression chemicals such as calcium lignosulfonate can treat the material to prevent handling problems. This material is commonly used to reduce coal dust emissions, and can be applied at a range of concentrations from 1% to 10% at a cost of $0.40 to $4.00 per ton.

The byproduct iron material must be shipped from the source to the power plant. Shipping the material from the source to the furnace will be the most expensive part of the process. The material can be shipped by truck, rail, or barge. It is important to minimize the distance being shipped and the number of transfers.

The next step in the process is mixing the material with the coal and feeding to the furnace. The iron fluxing material can be added at a variety of locations including:

Mixing with the coal at a shipping terminal

Adding to the coal reclaim belt

Adding to the coal bunkers

Using an eductor to aspirate the material and add to the coal or primary air streams.

The final step in the process is to control the feed rate of the material. This can involve either feed forward or feedback control. The feed forward control would be based upon the chemical analysis of the coal being feed from the boiler.

Feedback control could come from a variety of measured characteristics of boiler operation and downstream components such as:

LOI as measured by on-line furnace analyzer.

Carbon content in ash as determined from ash samples extracted from the flue gas or precipitator hopper.

Furnace exit gas temperature, which will decrease with less coal carryover from the cyclones.

Slag optical characteristics such as emissivity or surface temperature.

Slag tap flow monitoring.

Stack opacity.

The preferred feed system for cyclone boilers has been discussed with reference to FIGS. 4 and 5. The fluxing agent is transported pneumatically from covered railcar or truck to a storage silo where it is disengaged from the transport air by a bin vent filter. Level indicators in the silo show when the silo is full or nearing empty. The fluxing agent is discharged from the storage silo to a weigh feed bin through a rotary valve to the coal line. The mixture of coal, fluxing agent, and conveying air are then carried to the cyclone burner.

In one formulation, a zinc mineralizer is used.

The current additive embodiment contains 2-8% zinc. Zinc is a known mineralizer in the cement industry. Mineralizers are substances that reduce the temperature at which the cement clinker sinters by providing more contact points for mass transfer. As such, mineralizers could enhance the rate at which iron fluxes with PRB coal ash. A range of 0.5-15% zinc is preferred in this application. A range of 2-8% is more preferred.

The dusty, powdered iron material that is described in the patent application is extremely cohesive, and thus has a tendency to form dense, hard deposits in the delivery system. A number of flow aids and abrasive materials can be added to the material to aid in its handling. Possible flow aids include less than 5% of: ethylene glycol, proprietary agents known as "grind aids", and any other substance intended to reduce particle to particle attraction or sticking through electrostatic or mechanical means. Also included are any of a number of abrasive agents in the amount of 2-20% by weight. These agents include sand, blasting grit and boiler slag.

Results of testing to date:

The iron-containing additive fed at a rate of about 20 lb/t coal allows slag to flow at lower temperatures. As a result, the boiler is able to operate overnight at lower load (60 MW without the additive, 35 MW with it) without freezing the slag tap and risking a boiler shutdown. The advantage is that the boiler can be operated at lower load (and more efficient units can operate at higher load) when the price of electricity is below the marginal cost of generating the electricity, thus saving on fuel costs. A rough estimate of the cost savings for KCBPU is about $200K/y.

The iron-containing additive allows the cyclone boiler combustion process to operate more efficiently. These boilers are designed to burn the coal in a slag layer coating the cyclone barrel. When burning PRB coal, this slag layer is generally too thin and watery to capture the majority of the coal. Thus the coal burns in flight. This causes an increase in unburned coal and a decrease in boiler efficiency. To counteract this effect, additional air is supplied to the boiler and the coal is crushed more finely. This further decreases the boiler efficiency and increases the auxiliary power required to operate the boiler. Video recordings have shown that, with the additive, less unburned coal blows through the cyclone, which implies that the combustion process is operating closer to the way cyclones were designed to run.

EXPERIMENTAL

The slag viscosity of a cyclone furnace was modeled and used to compare the effects of the additive without the additive. The elemental analysis of BOF flue dust was used as the additive. The slag viscosity model showed that the BOF flue dust, when added to the coal to increase the ash iron percentage to 30% by weight (dry basis), increased the thickness of the slag layer in the cyclone by about 60%.

The coal used in the model was based on the specifications for western coal, which is as follows:

Total ash=about 2-15% (dry basis) of the coal
SiO2=about 20-35% (dry basis) of the ash
Al2O3=about 13-20% (dry basis) of the ash
TiO2=about 0-2% (dry basis) of the ash
Fe2O3=about 3-10% (dry basis) of the ash
CaO=about 18-35% (dry basis) of the ash
MgO=about 3-10% (dry basis) of the ash
Na2O=about 0-3% (dry basis) of the ash
K2O=about 0-1% (dry basis) of the ash
SO3/other=about 6-20% (dry basis) of the ash The model also showed that the temperature at which the ash would have a viscosity of 250 poise would be reduced by at least 100° F. The temperature is an important indicator of the minimum temperature at which the slag will flow. If the temperature at which the ash has a viscosity of 250 poise or lower is too high, then the slag will not flow to the slag tap on the floor of the boiler, and the slag will build up inside the boiler casing. This has been a problem on cyclone furnaces burning western coal at less than full design output.

Figure 6:
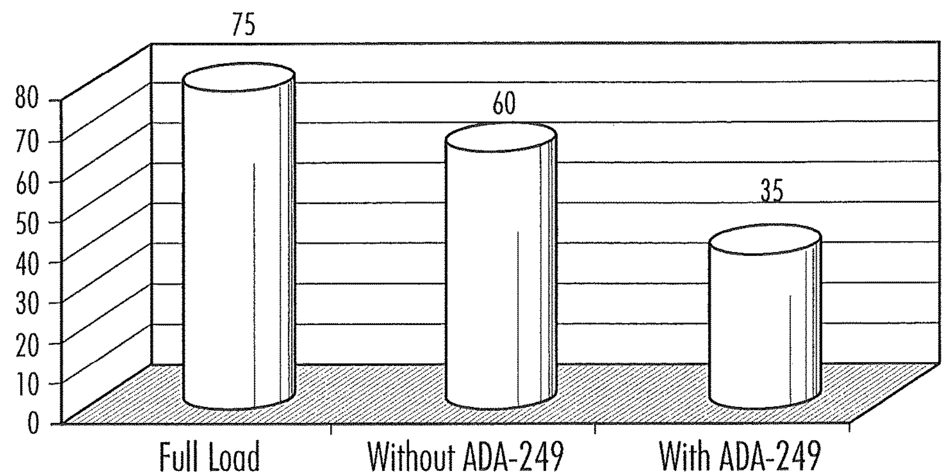
FIG. 6 is a chart of load (vertical axis) versus additive/no additive conditions (horizontal axis)

The first field test of the additive took place at a 75 MW unit in the midwest. A pneumatic storage and injection system was installed at the site, and boiler performance data was obtained during April of 2000. The changes in boiler operation were dramatic as shown in FIG. 6. In FIG. 6, "ADA-249" refers to the additive of the present invention.

Based on FIG. 6 and other experimental information, various observations may be made regarding the performance of ADA-249.

- Minimum load was reduced from 75% to 47% of rated capacity when using only about 20 lb. of the additive per ton of coal.
- The cost impact on load dispatch was about $200K/y, not counting the expected increase in unit availability from fewer shutdowns to clean the "monkey hole".
- A high-temperature video camera also showed that the main furnace is clear when injecting the additive (meaning that the coal stays in the cyclone to burn) instead of hazy due to unburned fuel when no additive is injected.
- The plant confirms that flyash LOI is low and bottom ash is acceptable for high-value sale when the additive is on.

Figure 7:
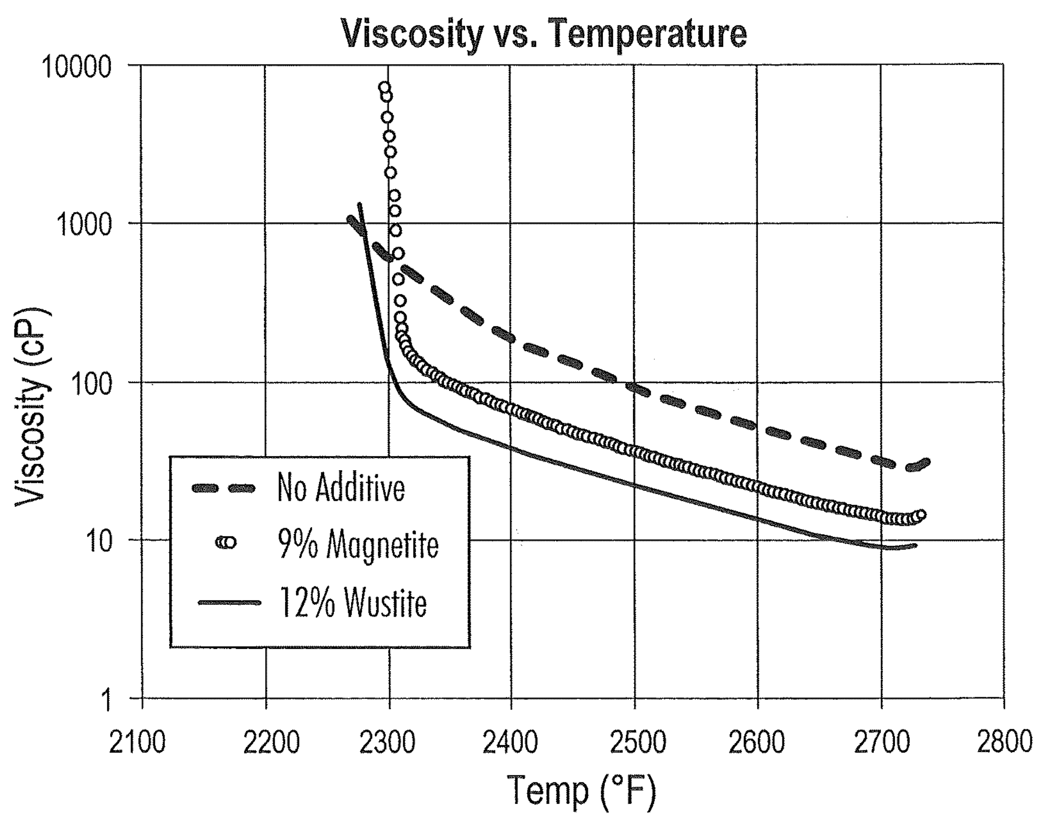
FIG. 7 is a plot of viscosity (Cp) (vertical axis) versus temperature (horizontal axis) for various experiments.
Figure 8:
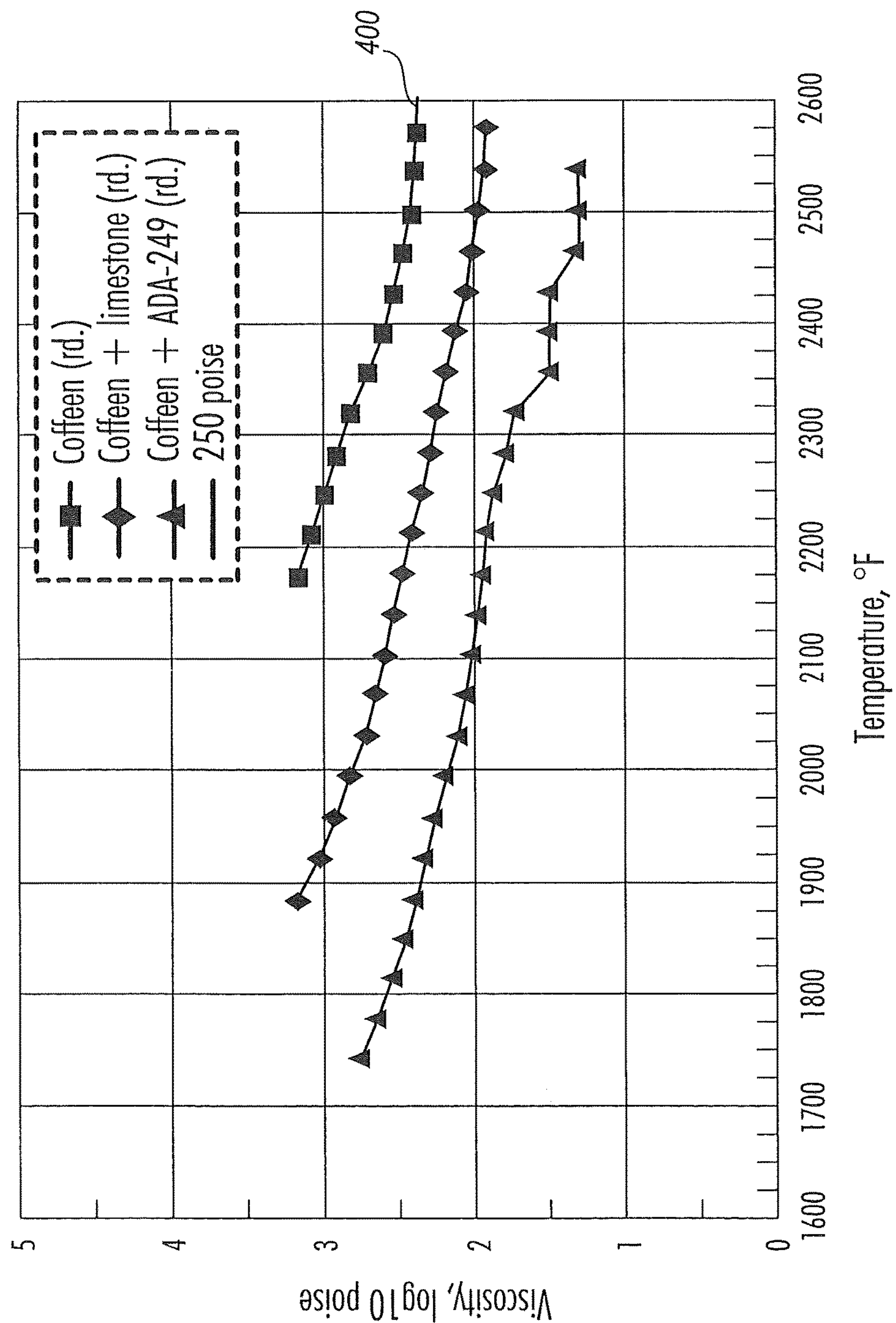
FIG. 8 is a plot of viscosity (Cp) (vertical axis) versus temperature (horizontal axis)

While all iron compounds will flux and thicken the slag layer when burning low-sulfur coals, the effects are improved by incorporating a blend of reduced iron compounds such as Wustite (FeO) and Magnetite ($Fe_3O_4$). FIG. 7 shows this effect. This figure shows temperature and viscosity data for a typical slag alone (shown as "No Additive"), compared to the same slag treated with 9 wt. % (of the slag (dry basis)) magnetite or 12 wt. % (of the slag (dry basis)) wustite at levels to give the same percent iron in the mixture. It can be seen that wustite allows slag flow at a lower temperature. Further, wustite contributes iron crystals to the melt (as indicated by the sharp rise in the curve) at a lower temperature. Wustite is comparatively rare in nature, but is a byproduct of the BOF processes. The present invention can also be applied to eastern low-sulfur coals having very high ash melting temperatures. FIG. 8 compares the viscosity-temperature relationships of coal slag alone (shown as "Coffeen (rd.)"), against the same coal slag treated with 2 percent limestone (shown as "Coffeen+limestone (rd.)") or 2 percent of the additive (shown as "Coffeen+ADA-249 (rd.)"). The horizontal line 400 denotes the value of 250 poise. The basis for this comparison is the $T_{250}$, a slag characteristic used by fuel buyers to select the proper coal for cyclone furnaces. This value represents the temperature below which the slag will not flow out of the cyclone combustor.

The slag without additive has a $T_{250}$ of about 2500° F., which is slightly higher than the maximum recommended $T_{250}$ of 2450° F. By adding 2% limestone, the $T_{250}$ can be lowered into the acceptable range (around 2200° F.). However, the same amount of the additive was able to reduce the T2 so to below 1900° F. Looking at it another way, the $T_{250}$ coal requirement could be satisfied by adding half as much of the additive as limestone. Because of the increased effectiveness of the additive of the present invention, it becomes an economic alternative to limestone for eastern bituminous coals.

While various embodiments of the present invention have been described in detail, it is apparent that further modifications and adaptations of the invention will occur to those skilled in the art. However, it is to be expressly understood that such modifications and adaptations are within the spirit and scope of the present invention.

The invention claimed is:

1. A method of operating a solid fuel fired boiler, comprising:

introducing a solid fuel into the boiler, wherein the solid fuel is a low sulfur Western coal;

introducing an iron-containing material into the boiler, wherein the iron-containing material is at least one of mill scale from steel production and dust from blast furnace gas cleaning equipment, wherein the iron-containing material comprises at least one carbon compound comprising one or more of a hydrocarbon, oil, grease, and xanthan gum; and at least partially combusting the solid fuel to produce an ash slag, wherein, in the at least partially combusting step, at least one of the following is true:

(i) the ash slag has a fluid temperature less than a fluid temperature characteristic of the ash slag produced from combustion of the solid fuel alone; and (ii) the ash slag has a melting point less than the melting point of a second ash slag produced from the combustion of the solid fuel alone, wherein the low sulfur Western coal has a sulfur content of less than about 1.5 wt. % (dry basis of the coal) and wherein the ash slag has a melting point during the at least partially combusting step that is less than the melting point of the second ash slag produced from combustion of the solid fuel alone.

2. The method of claim 1, wherein the low sulfur Western coal is a Powder River Basin coal and wherein the ash slag has a viscosity during the at least partially combusting step that is less than the viscosity of the second ash slag produced from combustion of the solid fuel alone.

3. The method of claim 1, wherein at least a portion of the iron-containing material fluxes the ash slag to produce a second ash slag having at least one characteristic selected from the group consisting of viscosity and melting temperature less than the same characteristic of the second ash slag produced from combustion of the solid fuel alone.

4. The method of claim 1, wherein a $T_{250}$ temperature at which the ash slag has a viscosity of 250 poise produced from the combustion of the solid fuel and iron-containing material is at least 100 degrees Fahrenheit lower than the $T_{250}$ temperature of the second ash slag produced from the combustion of the solid fuel alone.

5. The method of claim 1, wherein (i) is true.

6. The method of claim 1, wherein (ii) is true.

7. The method of claim 1, wherein the solid fuel is introduced into a wet-bottom boiler.

8. The method of claim 7, wherein both (i) and (ii) are true.

9. The method of claim 1, wherein the solid fuel comprises a sub-bituminous coal and wherein the solid fuel has a low iron content and a high alkali content.

10. The method of claim 1, wherein the boiler is for at least one of steam production and electricity generation and wherein the iron-containing material has a $P_{90}$ size of no more than about 300 microns.

11. The method of claim 1, wherein the boiler is a cyclone boiler.

12. The method of claim 11, wherein the cyclone boiler comprises:

a fuel storage bunker;

a cyclone burner;

a fuel transfer system communicating with the fuel storage bunker and the cyclone burner; and a combustion chamber comprising an enclosure at least partially surrounding the burners.

13. The method of claim 11, wherein the iron-containing material is added to the solid fuel before introducing the solid fuel and the iron-containing material into the boiler.

14. The method of claim 11, wherein the ash slag has a viscosity in the boiler less than the viscosity in the boiler of a second ash slag produced from the combustion of the solid fuel alone.

15. The method of claim 1, wherein the ash slag has a viscosity such that the ash slag flows from the boiler.

16. The method of claim 11, further comprising reducing the particle size of the solid fuel prior to introducing the solid fuel into the boiler.

17. The method of claim 1, wherein the iron-containing material is mill scale from steel production.

18. The method of claim 1, wherein the iron-containing material is dust from blast furnace gas cleaning equipment.

19. The method of claim 1, wherein the iron-containing material comprises at least one of ferrous oxide and ferric iron oxide.

20. The method of claim 1, wherein the iron-containing material comprises magnetite.

21. The method of claim 1, wherein the boiler comprises:

a particle size reduction device, wherein the solid fuel is fed to the device;

a burner;

a fuel transfer system communicating with the device and the burner; and a combustion chamber comprising an enclosure at least partially surrounding the burner and further comprising:

introducing the iron-containing material into at least one of the fuel storage bunker, the fuel transfer system, the cyclone burner, and the combustion chamber.

22. The method of claim 1, wherein the iron-containing material is introduced into the boiler in an amount ranging from about 10 lb/ton of solid fuel to about 50 lb/ton of solid fuel.

23. The method of claim 1, wherein the ash slag has a total iron concentration of at least about 15 weight percent.

24. The method of claim 1, wherein the iron-containing material is selected from the group consisting of ferrous oxide, ferric oxide, ferrous sulfide, ferric sulfide, and combinations thereof.

25. The method of claim 1, wherein the low sulfur Western coal is a Powder River Basin coal, wherein the additive comprises one or more of mill scale fines and particles removed by particulate collection systems from one or more of off-gases of steel manufacturing and off-gases from iron manufacturing, and wherein the coal-containing fuel has a total iron content of less than about 10 wt. % (dry basis of the ash).

26. The method of claim 1, wherein the boiler is a slag-tap furnace.

27. The method of claim 1, wherein the solid fuel boiler is used for at least one of steam production and electricity generation.

28. A method of operating a solid fuel fired boiler, comprising:

introducing a solid fuel into a wet-bottom boiler, wherein the solid fuel is a low sulfur Western coal;

introducing an iron-containing material into the wet-bottom boiler, wherein the iron-containing material is at least one of mill scale from steel production and dust from blast furnace gas cleaning equipment, wherein the iron-containing material comprises at least one carbon compound comprising one or more of a hydrocarbon, oil, grease, and xanthan gum; and at least partially combusting the solid fuel to produce an ash slag, wherein at least a portion of the iron-containing material fluxes the ash slag to cause the ash slag to have a melting temperature less than the melting temperature of a second ash slag produced from the combustion of the solid fuel alone, wherein the low sulfur Western coal has a sulfur content of less than about 1.5 wt. % (dry basis of the coal), wherein the solid fuel comprises a sub-bituminous coal, wherein the coal has a total iron content of less than about 10 wt. % (dry basis of the ash), and wherein the coal has a calcium content of at least about 15 wt. % (dry basis of the ash).

29. The method of claim 28, wherein the low sulfur Western coal is a Powder River Basin coal, wherein the boiler is for at least one of steam production and electricity generation, and wherein the iron-containing material has a $P_{90}$ size of no more than about 300 microns.

30. The method of claim 28, wherein the boiler is a cyclone boiler.

31. The method of claim 30, wherein the cyclone boiler comprises:

a fuel storage bunker;

a cyclone burner;

a fuel transfer system communicating with the fuel storage bunker and the cyclone burner; and a combustion chamber comprising an enclosure at least partially surrounding the burners.

32. The method of claim 28, wherein the ash slag has a viscosity such that the ash slag flows from the wet-bottom boiler.

33. The method of claim 28, further comprising reducing the particle size of the solid fuel prior to introducing the solid fuel into the boiler.

34. The method of claim 28, wherein the iron-containing material is mill scale from steel production.

35. The method of claim 28, wherein the iron-containing material is dust from blast furnace gas cleaning equipment.

36. The method of claim 28, wherein the iron-containing material comprises at least one of ferrous oxide and ferric iron oxide.

37. The method of claim 28, wherein the iron-containing material comprises magnetite.

38. The method of claim 28, wherein the wet-bottom boiler comprises:

a particle size reduction device, wherein the solid fuel is fed to the device;

a burner;

a fuel transfer system communicating with the device and the burner; and a combustion chamber comprising an enclosure at least partially surrounding the burner and further comprising:

introducing the iron-containing material into at least one of the fuel storage bunker, the fuel transfer system, the cyclone burner, and the combustion chamber.

39. The method of claim 28, wherein the iron-containing material is introduced into the boiler in an amount ranging from about 10 lb/ton of solid fuel to about 20 lb/ton of solid fuel.

40. The method of claim 28, wherein the ash slag has a total iron concentration of at least about 15 weight percent.

41. The method of claim 28, wherein the iron-containing material is added to the solid fuel before introducing the solid fuel and the iron-containing material into the boiler.

42. The method of claim 28, wherein the second ash slag has a viscosity in the boiler less than the viscosity in the boiler of the ash slag produced from the combustion of the solid fuel alone.

43. The method of claim 28, wherein the iron-containing material is selected from the group consisting of ferrous oxide, ferric oxide, ferrous sulfide, ferric sulfide, and combinations thereof.

44. The method of claim 28, wherein, in the at least partially combusting step, a fluid temperature of the ash slag is less than the fluid temperature of a second ash slag produced from combustion of the solid fuel alone.

45. A method of operating a solid fuel fired boiler, comprising:

introducing a solid fuel into a wet-bottom boiler, the solid fuel comprising a low sulfur Western coal;

introducing an iron-containing material into the wet-bottom boiler, wherein the iron-containing material is at least one of mill scale from steel production and dust from blast furnace gas cleaning equipment, wherein the iron-containing material comprises at least one carbon compound comprising one or more of a hydrocarbon, oil, grease, and xanthan gum; and at least partially combusting the solid fuel to produce an ash slag, wherein at least a portion of the iron-containing material fluxes the ash slag to cause the ash slag to have a viscosity in the boiler less than the viscosity in the boiler of a second ash slag produced from the combustion of the solid fuel alone, wherein low sulfur Western coal has a sulfur content of less than about 1.5 wt. % (dry basis of the coal) and wherein the boiler is for at least one of steam production and electricity generation and wherein the iron-containing material has a $P_{90}$ size of no more than about 300 microns.

46. The method of claim 45, wherein the low sulfur Western coal is a Powder River Basin coal and wherein the solid fuel comprises a sub-bituminous coal.

47. The method of claim 45, wherein the boiler is a cyclone boiler, wherein the low sulfur coal has a total iron content of less than about 10 wt. % (dry basis of the ash), and wherein the low sulfur coal has a calcium content of at least about 15 wt. % (dry basis of the ash).

48. The method of claim 47, wherein the cyclone boiler comprises:

a fuel storage bunker;

a cyclone burner;

a fuel transfer system communicating with the fuel storage bunker and the cyclone burner; and a combustion chamber comprising an enclosure at least partially surrounding the burners.

49. The method of claim 45, wherein the ash slag has a viscosity such that the ash slag flows from the wet-bottom boiler.

50. The method of claim 45, further comprising reducing the particle size of the solid fuel prior to introducing the solid fuel into the boiler.

51. The method of claim 45, wherein the iron-containing material is mill scale from steel production.

52. The method of claim 45, wherein the iron-containing material is dust from blast furnace gas cleaning equipment.

53. The method of claim 45, wherein the iron-containing material comprises at least one of ferrous oxide and ferric iron oxide.

54. The method of claim 45, wherein the iron-containing material comprises magnetite.

55. The method of claim 45, wherein the wet-bottom boiler comprises:

a particle size reduction device, wherein the solid fuel is fed to the device;

a burner;

a fuel transfer system communicating with the device and the burner; and a combustion chamber comprising an enclosure at least partially surrounding the burner and further comprising:

introducing the iron-containing material into at least one of the fuel storage bunker, the fuel transfer system, the cyclone burner, and the combustion chamber.

56. The method of claim 45, wherein the iron-containing material is introduced into the boiler in an amount ranging from about 10 lb/ton of solid fuel to about 50 lb/ton of solid fuel.

57. The method of claim 45, wherein the ash slag has a total iron concentration of at least about 15 weight percent.

58. The method of claim 45, wherein the iron-containing material is added to the solid fuel before introducing the solid fuel and the iron-containing material into the boiler.

59. The method of claim 45, wherein the ash slag has a melting temperature less than the melting temperature of the second ash slag produced from the combustion of the solid fuel alone.

60. The method of claim 45, wherein the iron-containing material is selected from the group consisting of ferrous oxide, ferric oxide, ferrous sulfide, ferric sulfide, and combinations thereof.

61. The method of claim 45, wherein, in the at least partially combusting step, a fluid temperature of the ash slag is less than a fluid temperature of the second ash slag produced from combustion of the solid fuel alone.

62. The method of claim 45, wherein the low sulfur Western coal has a sulfur content of less than about 1.5 wt. % (dry basis of the coal) and wherein the coal-containing fuel has a total iron content of less than about 10 wt. % (dry basis of the ash) and a calcium content of at least about 15 wt. % (dry basis of the ash).

63. A method of operating a solid fuel fired boiler, comprising:

introducing a solid fuel into a wet-bottom boiler, the solid fuel comprising a low sulfur Western coal;

introducing an iron-containing material into the wet-bottom boiler, wherein the iron-containing material comprises iron oxides and at least one carbon compound comprising one or more of a hydrocarbon, oil, grease, and xanthan gum; and at least partially combusting the solid fuel to produce an ash slag, wherein at least a portion of the iron-containing material fluxes the ash slag to cause the ash slag to have a viscosity less than a viscosity of a second ash slag produced from the combustion of the solid fuel alone, wherein the low sulfur Western coal has a sulfur content of less than about 1.5 wt. % (dry basis of the coal) and wherein the solid fuel comprises a sub-bituminous coal.

64. The method of claim 63, wherein the low sulfur Western coal is a Powder River Basin coal and wherein the boiler is for at least one of steam production and electricity generation and wherein the iron-containing material has a $P_{90}$ size of no more than about 300 microns.

65. The method of claim 63, wherein the boiler is a cyclone boiler, wherein the solid fuel has a total iron content of less than about 10 wt. % (dry basis of the ash), and wherein the solid fuel has an alkali content of at least about 20 wt. % (dry basis of the ash).

66. The method of claim 65, wherein the cyclone boiler comprises:

a fuel storage bunker;

a cyclone burner;

a fuel transfer system communicating with the fuel storage bunker and the cyclone burner; and a combustion chamber comprising an enclosure at least partially surrounding the burners.

67. The method of claim 63, wherein the ash slag has a viscosity such that the ash slag flows from the wet-bottom boiler.

68. The method of claim 63, further comprising reducing the particle size of the solid fuel prior to introducing the solid fuel into the boiler.

69. The method of claim 63, wherein the iron-containing material is mill scale from steel production.

70. The method of claim 63, wherein the iron-containing material is dust from blast furnace gas cleaning equipment.

71. The method of claim 63, wherein the iron-containing material comprises at least one of ferrous oxide and ferric iron oxide.

72. The method of claim 63, wherein the iron-containing material comprises magnetite.

73. The method of claim 63, wherein the wet-bottom boiler comprises:

a particle size reduction device, wherein the solid fuel is fed to the device;

a burner;

a fuel transfer system communicating with the device and the burner; and a combustion chamber comprising an enclosure at least partially surrounding the burner and further comprising:

introducing the iron-containing material into at least one of the fuel storage bunker, the fuel transfer system, the cyclone burner, and the combustion chamber.

74. The method of claim 63, wherein the iron-containing material is introduced into the boiler in an amount ranging from about 10 lb/ton of solid fuel to about 20 lb/ton of solid fuel.

75. The method of claim 63, wherein the ash slag has a total iron concentration of at least about 15 weight percent.

76. The method of claim 63, wherein the iron-containing material is added to the solid fuel before introducing the solid fuel and the iron-containing material into the boiler.

77. The method of claim 63, wherein the ash slag has a melting point in the boiler less than the melting point in the boiler of the second ash slag produced from the combustion of the solid fuel alone.

78. The method of claim 63, wherein the iron-containing material is selected from the group consisting of ferrous oxide, ferric oxide, ferrous sulfide, ferric sulfide, and combinations thereof.

79. The method of claim 63, wherein, in the at least partially combusting step, a fluid temperature of the ash slag is less than the fluid temperature of the second ash slag produced from combustion of the solid fuel alone.

80. The method of claim 63, wherein the low sulfur Western coal has a sulfur content of less than about 1.5 wt. % (dry basis of the coal) and wherein the coal-containing fuel has a total iron content of less than about 10 wt. % (dry basis of the ash) and a calcium content of at least about 15 wt. % (dry basis of the ash).

81. A method for operating a slag type furnace, comprising:

introducing a coal-containing fuel into said slag type furnace, the coal-containing fuel comprising a low sulfur Western coal having a sulfur content of less than about 1.5 wt. % (dry basis of the coal);

introducing an iron-containing additive into the slag type furnace in an amount sufficient to flux the coal-containing fuel, wherein the iron-containing material comprises at least one carbon compound comprising one or more of a hydrocarbon, oil, grease, and xanthan gum; and melting at least a portion of the coal-containing fuel to produce an ash slag, wherein, in the melting step, at least a portion of the iron-containing additive fluxes the ash slag to produce a slag layer having a melting point less than a melting point of a second slag layer without the iron-containing additive, wherein at least about 33.5% of the iron-containing additive is in the form of ferrous iron and no more than about 66.5% of the iron in the additive is in the form of ferric iron.

82. The method of claim 81, wherein the additive is in the form of a free-flowing particulate having a $P_{90}$ size of no more than about 300 microns.

83. The method of claim 81, wherein the low sulfur Western coal has a sulfur content of less than about 1.5 wt. % (dry basis of the coal) and wherein the coal-containing fuel has a total iron content of less than about 10 wt. % (dry basis of the ash) and a calcium content of at least about 15 wt. % (dry basis of the ash).

84. A method of operating a solid fuel fired boiler, comprising:

introducing a solid fuel into a wet-bottom boiler, wherein the solid fuel is a low sulfur Western coal;

introducing an iron-containing material into the wet-bottom boiler, wherein the iron-containing material is at least one of mill scale from steel production and dust from blast furnace gas cleaning equipment, wherein the iron-containing material comprises at least one carbon compound comprising one or more of a hydrocarbon, oil, grease, and xanthan gum; and at least partially combusting the solid fuel to produce an ash slag, wherein at least a portion of the iron-containing material fluxes the ash slag to cause the ash slag to have a melting temperature less than the melting temperature of a second ash slag produced from the combustion of the solid fuel alone, wherein the iron-containing material is added to the solid fuel before introducing the solid fuel and the iron-containing material into the boiler.

85. A method for operating a slag type furnace, comprising:

introducing a coal-containing fuel into said slag type furnace, the coal-containing fuel comprising a low sulfur Western coal having a sulfur content of less than about 1.5 wt. % (dry basis of the coal);

introducing an iron-containing additive into the slag type furnace in an amount sufficient to flux the coal-containing fuel, wherein the iron-containing material comprises at least one carbon compound comprising one or more of a hydrocarbon, oil, grease, and xanthan gum; and melting at least a portion of the coal-containing fuel to produce an ash slag, wherein, in the melting step, at least a portion of the iron-containing additive fluxes the ash slag to produce a slag layer having a melting point less than a melting point of a second slag layer without the iron-containing additive, wherein the additive is in the form of a free-flowing particulate having a $P_{90}$ size of no more than about 300 microns.

86. A method of operating a solid fuel fired boiler, comprising:

introducing a solid fuel into a wet-bottom boiler, wherein the solid fuel is a low sulfur Western coal;

introducing an iron-containing material into the wet-bottom boiler, wherein the iron-containing material is at least one of mill scale from steel production and dust from blast furnace gas cleaning equipment, wherein the iron-containing material comprises at least one carbon compound comprising one or more of a hydrocarbon, oil, grease, and xanthan gum; and at least partially combusting the solid fuel to produce an ash slag, wherein at least a portion of the iron-containing material fluxes the ash slag to cause the ash slag to have a melting temperature less than the melting temperature of a second ash slag produced from the combustion of the solid fuel alone, wherein the low sulfur Western coal has a sulfur content of less than about 1.5 wt. % (dry basis of the coal) and wherein the coal-containing fuel has a total iron content of less than about 10 wt. % (dry basis of the ash) and a calcium content of at least about 15 wt. % (dry basis of the ash).

87. A method of operating a solid fuel fired boiler, comprising:

introducing a solid fuel into a wet-bottom boiler, the solid fuel comprising a low sulfur Western coal;

introducing an iron-containing material into the wet-bottom boiler, wherein the iron-containing material is at least one of mill scale from steel production and dust from blast furnace gas cleaning equipment, wherein the iron-containing material comprises at least one carbon compound comprising one or more of a hydrocarbon, oil, grease, and xanthan gum; and at least partially combusting the solid fuel to produce an ash slag, wherein at least a portion of the iron-containing material fluxes the ash slag to cause the ash slag to have a viscosity in the boiler less than the viscosity in the boiler of a second ash slag produced from the combustion of the solid fuel alone, wherein the low sulfur Western coal has a sulfur content of less than about 1.5 wt. % (dry basis of the coal) and wherein the coal-containing fuel has a total iron content of less than about 10 wt. % (dry basis of the ash) and a calcium content of at least about 15 wt. % (dry basis of the ash).

88. A method of operating a solid fuel fired boiler, comprising:

introducing a solid fuel into a wet-bottom boiler, the solid fuel comprising a low sulfur Western coal;

introducing an iron-containing material into the wet-bottom boiler, wherein the iron-containing material comprises iron oxides and at least one carbon compound comprising one or more of a hydrocarbon, oil, grease, and xanthan gum; and at least partially combusting the solid fuel to produce an ash slag, wherein at least a portion of the iron-containing material fluxes the ash slag to cause the ash slag to have a viscosity less than a viscosity of a second ash slag produced from the combustion of the solid fuel alone, wherein the low sulfur Western coal has a sulfur content of less than about 1.5 wt. % (dry basis of the coal) and wherein the coal-containing fuel has a total iron content of less than about 10 wt. % (dry basis of the ash) and a calcium content of at least about 15 wt. % (dry basis of the ash).

89. A method for operating a slag type furnace, comprising:

introducing a coal-containing fuel into said slag type furnace, the coal-containing fuel comprising a low sulfur Western coal having a sulfur content of less than about 1.5 wt. % (dry basis of the coal);

introducing an iron-containing additive into the slag type furnace in an amount sufficient to flux the coal-containing fuel, wherein the iron-containing material comprises at least one carbon compound comprising one or more of a hydrocarbon, oil, grease, and xanthan gum; and melting at least a portion of the coal-containing fuel to produce an ash slag, wherein, in the melting step, at least a portion of the iron-containing additive fluxes the ash slag to produce a slag layer having a melting point less than a melting point of a second slag layer without the iron-containing additive, wherein the low sulfur Western coal has a sulfur content of less than about 1.5 wt. % (dry basis of the coal) and wherein the coal-containing fuel has a total iron content of less than about 10 wt. % (dry basis of the ash) and a calcium content of at least about 15 wt. % (dry basis of the ash).

* * * * *